US012372960B2

(12) United States Patent
Lei

(10) Patent No.: US 12,372,960 B2
(45) Date of Patent: Jul. 29, 2025

(54) CONTROLLING DELIVERY VIA UNMANNED DELIVERY SERVICE THROUGH ALLOCATED NETWORK RESOURCES

(71) Applicant: Tencent Technology (Shenzhen) Company Limited, Guangdong (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 248 days.

(21) Appl. No.: 17/978,853

(22) Filed: Nov. 1, 2022

(65) Prior Publication Data

US 2023/0045979 A1 Feb. 16, 2023

Related U.S. Application Data

(63) Continuation of application No. PCT/CN2021/127848, filed on Nov. 1, 2021.

(30) Foreign Application Priority Data

Nov. 6, 2020 (CN) .......................... 202011233895.5

(51) Int. Cl.
G05D 1/00 (2024.01)
(52) U.S. Cl.
CPC ......... G05D 1/0022 (2013.01); G05D 1/0088 (2013.01); G05D 1/0212 (2013.01)
(58) Field of Classification Search
CPC .. G05D 1/0022; G05D 1/0088; G05D 1/0212; G06Q 10/08; G08G 1/096725
See application file for complete search history.

(56) References Cited

U.S. PATENT DOCUMENTS 6,480,783 B1 11/2002 Myr
9,607,454 B1 * 3/2017 Raghu ................. G08G 1/0112
(Continued)

FOREIGN PATENT DOCUMENTS

CN 107133771 A 9/2017
CN 108827333 A 11/2018
(Continued)

OTHER PUBLICATIONS

Cloudfare, "What is latency?," 2019. (Year: 2019).*
(Continued)

*Primary Examiner* — Aniss Chad
*Assistant Examiner* — Stephanie T Su
(74) *Attorney, Agent, or Firm* — ArentFox Schiff LLP

(57) ABSTRACT

An unmanned vehicle control method includes acquiring a delivery request for an item, the delivery request comprising delivery information of the item, and determining, according to the delivery information, predicted travelling data associated with delivering the item and at least one of network coverage or network connection quality associated with the predicted travelling data. The method further includes allocating network resources according to the at least one of the network coverage or the network connection quality of the predicted travelling data, and generating a remote driving control instruction according to the predicted travelling data. The method further includes transmitting the remote driving control instruction to an unmanned vehicle using the allocated network resources, so as to cause the unmanned vehicle to drive based on the remote driving control instruction, the unmanned vehicle being configured to transport the item.

17 Claims, 8 Drawing Sheets

(56) References Cited

U.S. PATENT DOCUMENTS

| | | | | |
|---|---|---|---|---|
| 9,612,123 | B1* | 4/2017 | Levinson | B60Q 1/508 |
| 10,860,115 | B1* | 12/2020 | Tran | G06F 3/0346 |
| 2018/0023968 | A1* | 1/2018 | Stuchfield | G01C 21/3453 |
| | | | | 701/416 |
| 2019/0392387 | A1* | 12/2019 | Quan | G06Q 10/0838 |
| 2020/0219331 | A1* | 7/2020 | Nishioka | G08G 1/065 |
| 2021/0362194 | A1* | 11/2021 | Lundahl | B07C 3/14 |

FOREIGN PATENT DOCUMENTS

| | | | |
|---|---|---|---|
| CN | 109872523 | A | 6/2019 |
| CN | 111405481 | A | 7/2020 |
| CN | 112422659 | A | 2/2021 |

OTHER PUBLICATIONS

Chinese Office Action issued in Application No. 202011233895.5, mailed Nov. 1, 2023, with English Translation, 29 pages.

International Search Report and Written Opinion issued in International Application No. PCT/CN2021/127848, mailed Jan. 28, 2022, with English Translation, 9 pages.

* cited by examiner

CONTROLLING DELIVERY VIA UNMANNED DELIVERY SERVICE THROUGH ALLOCATED NETWORK RESOURCES

RELATED APPLICATIONS

This application is a continuation of International Application No. PCT/CN2021/127848, entitled "SERVICE DATA PROCESSING METHOD, DEVICE, AND READABLE STORAGE MEDIUM," filed on Nov. 1, 2021, which claims priority to Chinese Patent Application No. 202011233895.5, entitled "METHOD, DEVICE, AND READABLE STORAGE MEDIUM FOR PROCESSING BUSINESS DATA" filed on Nov. 6, 2020. The entire disclosures of the prior applications are hereby incorporated by reference.

FIELD OF THE TECHNOLOGY

This application relates to the field of computer technologies, including a method, a device, and a readable storage medium for processing data.

BACKGROUND OF THE DISCLOSURE

Currently, online shopping has played an indispensable role in people's daily life, and online shopping behaviors such as ordering and shopping are bound to generate item delivery demands.

Items are currently mainly delivered manually. Due to a great item delivery demand and a large number of required delivery staff, labor costs are increased, resulting in a sharp rise in logistics costs.

SUMMARY

Embodiments of this disclosure provide a method, a device, and a readable storage medium for processing data, which can reduce logistics costs.

In an embodiment, an unmanned vehicle control method includes acquiring a delivery request for an item, the delivery request comprising delivery information of the item, and determining, according to the delivery information, predicted travelling data associated with delivering the item and at least one of network coverage or network connection quality associated with the predicted travelling data. The method further includes allocating network resources according to the at least one of the network coverage or the network connection quality of the predicted travelling data, and generating a remote driving control instruction according to the predicted travelling data. The method further includes transmitting the remote driving control instruction to an unmanned vehicle using the allocated network resources, so as to cause the unmanned vehicle to drive based on the remote driving control instruction, the unmanned vehicle being configured to transport the item.

In an embodiment, an unmanned vehicle control apparatus includes processing circuitry configured to acquire a delivery request for an item, the delivery request comprising delivery information of the item, and determine, according to the delivery information, predicted travelling data associated with delivering the item and at least one of network coverage or network connection quality associated with the predicted travelling data. The processing circuitry is further configured to allocate network resources according to the at least one of the network coverage or the network connection quality of the predicted travelling data, and generate a remote driving control instruction according to the predicted travelling data. The processing circuitry is further configured to transmit the remote driving control instruction to an unmanned vehicle using the allocated network resources, so as to cause the unmanned vehicle to drive based on the remote driving control instruction, the unmanned vehicle being configured to transport the item.

In an embodiment, a non-transitory computer-readable storage medium stores computer-readable instructions thereon, which, when executed by a computer device, cause the computer device to perform an unmanned vehicle control method. The unmanned vehicle control method includes acquiring a delivery request for an item, the delivery request comprising delivery information of the item, and determining, according to the delivery information, predicted travelling data associated with delivering the item and at least one of network coverage or network connection quality associated with the predicted travelling data. The method further includes allocating network resources according to the at least one of the network coverage or the network connection quality of the predicted travelling data, and generating a remote driving control instruction according to the predicted travelling data. The method further includes transmitting the remote driving control instruction to an unmanned vehicle using the allocated network resources, so as to cause the unmanned vehicle to drive based on the remote driving control instruction, the unmanned vehicle being configured to transport the item.

In the embodiments of this disclosure, a remote driving technology is introduced in delivery services for items, so as to control the unmanned vehicle to transport the items, thereby realizing unmanned delivery of the items, and improving efficiency. The item is a target item by way of example. A remote driving control request for a target item is acquired, and predicted travelling data associated with the target item is determined according to business service information in the remote driving control request, to generate a remote driving control instruction according to the predicted travelling data. The remote driving control instruction is transmitted to an unmanned vehicle, so that the unmanned vehicle can drive through the remote driving control instruction. This disclosure may provide an unmanned delivery service for the item based on the remote driving technology.

DESCRIPTION OF EMBODIMENTS

The following clearly and completely describes the technical solutions in the embodiments of this disclosure with reference to the accompanying drawings in the embodiments of this disclosure.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

The AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes fields such as a computer vision (CV) technology, a speech processing technology, a natural language processing technology, and machine learning/deep learning (DL).

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this disclosure belong to the autonomous driving technology in the field of artificial intelligence (AI).

Autonomous driving technologies usually include high-precision maps, environment perception, behavior decision-making, path planning, motion control, and other technologies. Self-determined driving technology has a wide range of application prospects.

Figure 1:
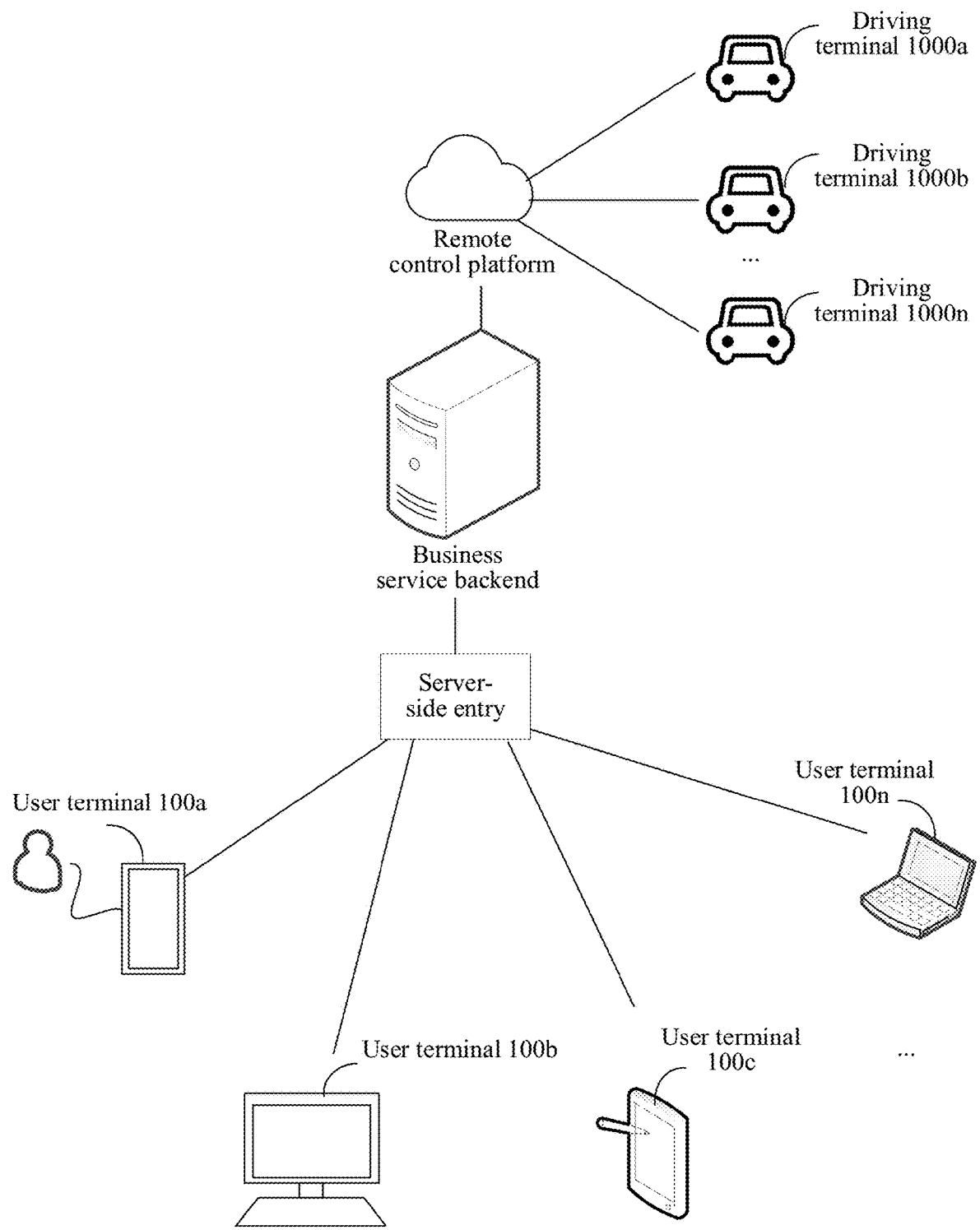
FIG. 1 is a network architecture diagram according to an embodiment of this disclosure.

FIG. 1 is a network architecture diagram according to an embodiment of this disclosure. As shown in FIG. 1, the network architecture may include a user terminal cluster, a server-side entry, a business service backend, a remote control platform, and a driving terminal cluster. The user terminal cluster may include one or more user terminals, and a quantity of the user terminals is not limited herein. As shown in FIG. 1, the plurality of user terminals may include a user terminal 100a, a user terminal 100b, a user terminal 100c, . . . , and a user terminal 100n. As shown in FIG. 1, the user terminal 100a, the user terminal 100b, the user terminal 100c, . . . , and the user terminal 100n may be respectively connected to the server-side entry via a network, so that each user terminal can exchange data with the server-side entry through the network connection.

The driving terminal cluster may include one or more driving terminals, and a quantity of the driving terminals is not limited herein. As shown in FIG. 1, the plurality of driving terminals may include a driving terminal 1000a, a driving terminal 1000b, . . . , and a driving terminal 1000n. As shown in FIG. 1, the driving terminal 1000a, the driving terminal 1000b, . . . , and the driving terminal 1000n may be respectively connected to the remote control platform via the network, so that each driving terminal can exchange data with the remote control platform through the network connection.

It may be understood that each user terminal shown in FIG. 1 may be equipped with a target application. The target application, when run in the each user terminal, may perform exchange with the server-side entry shown in FIG. 1, so that the server-side entry can receive business data from the each user terminal. The target application may include an application having a function of displaying data information such as characters, an image, an audio, a video, and the like. For example, the application may be an ordering application, and the ordering application may be used by a user to order food. The application may also be a shopping application, and the shopping application may be used by a user to purchase an item.

It is to be understood that the server-side entry in this disclosure may acquire business data according to these applications. For example, the business data may be delivery demand information of the user for an item. For example, when the user buys a piece of clothing, the user terminal may transmit a delivery demand for this piece of clothing to the server-side entry. Then the server-side entry may acquire destination-of-delivery address information of the clothing, attribute information (attributes such as volume and weight, that is, an item attribute) of the clothing, and user information (for example, a user name, user contact information, and the like) according to the delivery demand. Information such as the destination-of-delivery address information, the attribute information of the clothing, and the user information may be all used as the business data.

Then the server-side entry may generate a transport business request according to the business data, and transmit the transport business request together with the business data to the business service backend. Generally, the transport business request includes the business data. Subsequently, the business service backend may generate business service information according to the business data, and generate a remote driving request including the business service information. Then, the business service backend may transmit the remote driving request to the remote control platform. The remote control platform may determine predicted travelling data for the clothing according to the business service information in the remote driving request, the predicted travelling data including a predicted travelling route and a predicted travelling time, and determine a network coverage and network connection quality corresponding to the predicted travelling route and the predicted travelling time according to a service-level agreement (SLA) parameter specified in a network configuration rule (which may include the network coverage and the network connection quality). Subsequently, the remote control platform may allocate a corresponding network communication resource to a target driving terminal (any driving terminal in the driving terminal cluster, for example, the driving terminal is the driving terminal 1000b) according to the network coverage and the network connection quality. For example, the remote control platform may instruct, according to the network coverage and the network connection quality, a network base station to allocate the network communication resource to the target driving terminal for realizing the network coverage and the network connection quality. In this way, the target driving terminal is within the network coverage and is connected to the network when traveling on the predicted travelling route during the predicted travelling time.

Then the remote control platform may generate a remote driving control instruction, and transmit the remote driving control instruction to the target driving terminal. Since the network communication resource has been allocated to the target driving terminal, the target driving terminal may receive the remote driving control instruction, and autonomously drives through the remote driving control instruction, thereby performing the logistics transport of the clothing.

It may be understood that the remote control platform may acquire a current location and a current status of the target driving terminal on time (for example, every 30 minutes) during the logistics transport of the clothing, and generate a status and location report and transport the status and location report to the business service backend. The business service backend may transmit the status and location report to the server-side entry, and the server-side entry may return the status and location report to the user terminal. Then the user terminal may output the status and location report of the target driving terminal on a display interface, and the user may check a current location and a current status of the clothing purchased by the user.

In the embodiment of this disclosure, one of the plurality of user terminals may be selected as a target user terminal. The user terminal may include smart terminals such as a smart phone, a tablet computer, a notebook computer, a desktop computer, a smart TV, a smart speaker, a desktop computer, a smart watch, an onboard device that carry data processing functions (for example, a text data display function, a video data playback function, and a music data playback function), which is not limited thereto. For example, in the embodiment of this disclosure, the user terminal 100a shown in FIG. 1 may be used as the target user terminal, and the target user terminal may be integrated with the foregoing target application. In this case, the target user terminal may perform data exchange with the server-side entry through the target application.

For example, when the user uses the target application (such as the shopping application) in the user terminal, the user initiates a shopping request for a necklace in the shopping application, and the user terminal may transmit the shopping request to the server-side entry. Then the server-side entry may acquire receiving address information (that is, the destination-of-delivery address information of the necklace) of the user, the user information (such as a user name, contact information, and the like), and ship-from address information of the necklace (that is, origin-of-delivery address information of the necklace). The server-side entry may generate a transport business request for the necklace, and transmit the transport business request and the receiving address information, the user information, the ship-from address information, and the like to the business service backend. The business service backend may determine an expected transport time (an expected transport time range) according to the information such as the receiving address information, the user information, and the ship-from address information carried in the transport business request, and generate business service information. The business service backend may generate a remote driving request including the business service information, and transmit the remote driving request to the remote control platform. Then the remote control platform may determine the predicted travelling route and the predicted travelling time for the necklace according to the remote driving request, and determine quality of service (QoS) parameters (including the network coverage and the network connection quality) corresponding to the predicted travelling route and the predicted travelling time according to the Service-Level Agreement (SLA) parameter specified in the network configuration rule. Then the remote control platform may allocate, according to the network coverage and the network connection quality, the corresponding network communication resource to the target driving terminal configured to transport the necklace. Then the remote control platform may generate a remote driving control instruction, and transmit the remote driving control instruction to the target driving terminal. Since the network communication resource has been allocated to the target driving terminal, the target driving terminal may receive the remote driving control instruction, and autonomously drives through the remote driving control instruction, thereby performing the delivery of the necklace.

In a possible implementation, it may be understood that the business service backend shown in FIG. 1 may be integrated into the remote control platform in the form of functional modules. That is to say, the remote control platform may receive data from the server-side entry (for example, the transport business request and the receiving address information, the user information, the ship-from address information, the item attribute information, and the like), determine the expected transport time, so as to determine the predicted travelling route and the predicted travelling time for the item (for example, the necklace), determine the QoS parameters corresponding to the predicted travelling route and the predicted travelling time according to the SLA parameter specified in the network configuration rule, and generate the remote driving request according to the QoS parameter.

In a possible implementation, it may be understood that the server-side entry shown in FIG. 1 may also be integrated into the user terminal in the form of functional modules.

It may be understood that the method provided in the embodiment of this disclosure may be performed by a computer device, the computer device including but not limited to a user terminal or the remote control platform. The remote control platform may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

The user terminal and the remote control platform may be directly or indirectly connected in a manner of wired or wireless communication, which is not limited herein in this disclosure.

Figure 2:
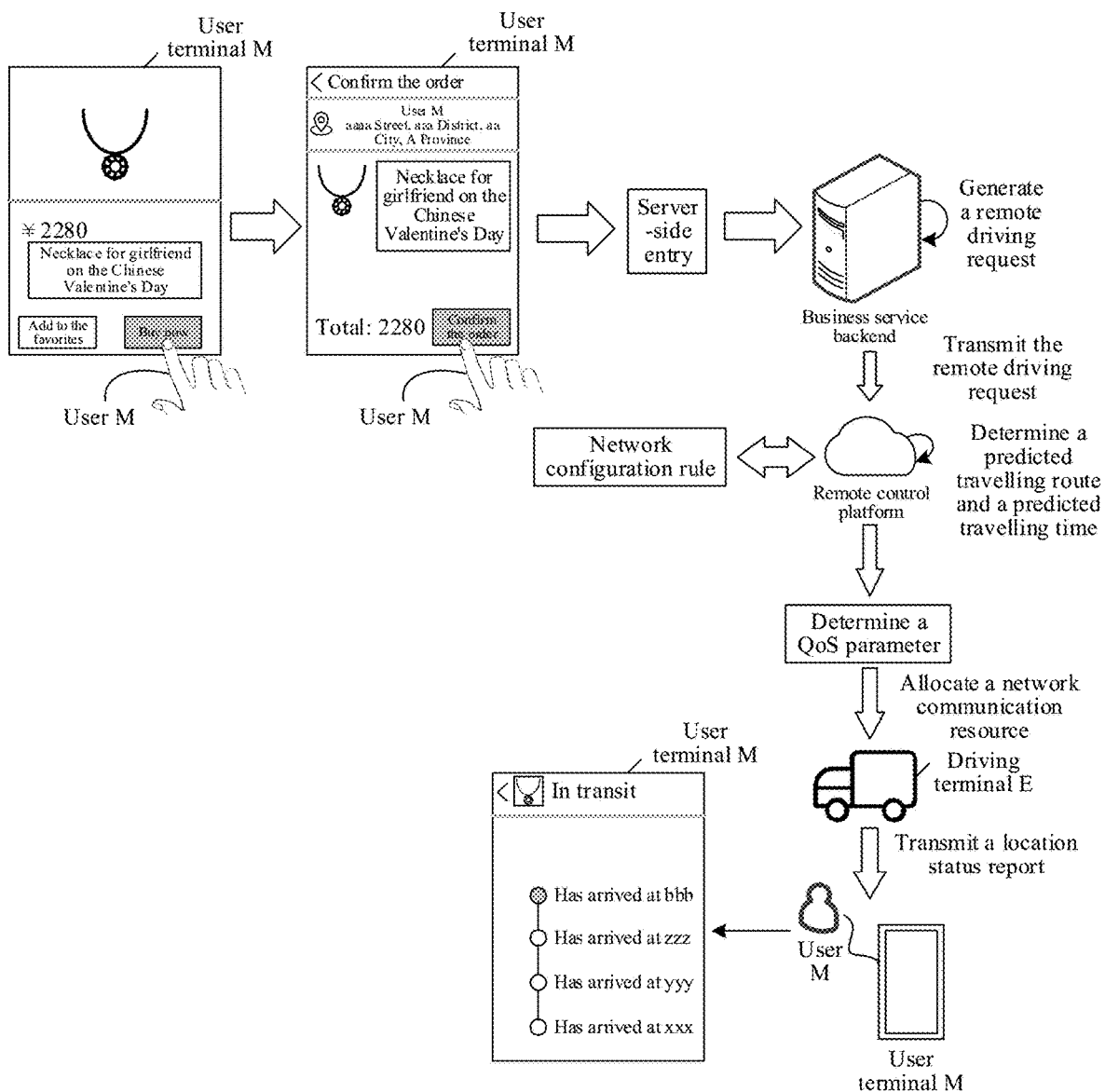
FIG. 2 is a schematic diagram of a scenario according to an embodiment of this disclosure.

For ease of understanding, FIG. 2 is a schematic diagram of a scenario according to an embodiment of this disclosure. The server-side entry shown in FIG. 2 may be the server-side entry shown in FIG. 1, the business service backend shown in FIG. 2 may be the business service backend shown in FIG. 1, and the user terminal M shown in FIG. 2 may be any user terminal selected from the user terminal cluster in the embodiment corresponding to FIG. 1. For example, the user terminal may be the foregoing user terminal 100b. A driving terminal E shown in FIG. 2 may be any driving terminal selected from the driving terminal cluster in the embodiment corresponding to FIG. 1. For example, the driving terminal may be the foregoing driving terminal 1000b.

As shown in FIG. 2, a user M uses a shopping application to initiate a shopping request for a necklace, and the user terminal M may transmit the shopping request of the user M to the server-side entry after the user M confirms information such as delivery address information and a price of the necklace. The server-side entry may generate the transport business request, and transmit the transport business request to the business service backend together with information such as the item attribute, the travelling address information (the receiving address information and the ship-from address information), the user information (a name of a receiving user, the contact information, and the like), and the like. Then the business service backend may determine the expected transport time and generate the business service information including the travelling address information and the expected transport time. The business service backend may determine the expected transport time range corresponding to the travelling address information, and generate the business service information including the item attribute, the travelling address information (the receiving address information and the ship-from address information), the user information (the name of the receiving user, the contact information, and the like), the expected transport time range, and the like.

Then the business service backend may generate the remote driving request according to the business service information, and transmit the remote driving request to the remote control platform. The remote control platform may determine the predicted travelling route and the predicted travelling time according to the business service information in the remote driving request, and determine the network connection range and the network connection quality respectively corresponding to the predicted travelling route and the predicted travelling time according to an SLA parameter specified in a rule for network configuration between the business service backend and the remote control platform. For example, the remote control platform may acquire the QoS parameter (which may include the network coverage and the network connection quality) corresponding to the predicted travelling route according to the network configuration rule. For example, the predicted travelling route is an R city-a U city-aaaa Street, aaa District, aa City, A Province. The business server may acquire the network coverage and the network connection quality specified and configured for R City in the network configuration rule, may also acquire the network coverage and the network connection quality specified and configured for U City in the network configuration rule, and may further acquire the network coverage and the network connection quality specified and configured for aaaa Street, aaa District, aa City, A Province in the network configuration rule. Similarly, the remote control platform may also acquire the QoS parameter corresponding to the predicted travelling time (which may include the network coverage and the network connection quality) according to the network configuration rule. For example, if the predicted travelling time is 13:00-14:30, the remote control platform may match the predicted travelling time with a set of specified time periods included in the network configuration rule, and determine that a time range to which the predicted travelling time belongs is the specified time period of 13:00-15:00. The business server may acquire the network coverage and the network connection quality specified and configured for the time range of 13:00-15:00 in the network configuration rule, and determine the network coverage and the network connection quality corresponding to the time range 13:00-15:00 as the QoS parameter corresponding to the predicted travelling time of 13:00-14:30.

In some cases, the remote control platform may allocate a network communication resource corresponding to the QoS parameter to the driving terminal 1000b according to the network connection range and the network connection quality. It is to be understood that if the QoS parameter corresponding to the travelling time is inconsistent with the QoS parameter corresponding to the region when the driving terminal 1000b travels to a certain region in the predicted travelling route, an optimal QoS parameter (for example, with a relatively large network coverage and relatively high network connection quality) may be selected from the QoS parameters as the final QoS parameter.

Then the remote control platform may generate a remote driving control instruction according to the predicted travelling route and the predicted travelling time, and transmit the remote driving control instruction to the driving terminal 1000b. It is to be understood that if the network communication resource has been allocated to the driving terminal 1000b, the driving terminal 1000b may receive the remote driving control instruction, and autonomously drives through the remote driving control instruction, so as to perform the unmanned delivery of the necklace.

It may be understood that, during the delivery of the necklace by the driving terminal 1000b, the remote control platform may acquire a location and a status (for example, a smooth traffic status, a congested traffic status, and the like) of the driving terminal 1000b on time (for example, every 10 minutes), and generate the location status report and transmit the location status report to the business service backend. The business service backend may forward the location status report to the server-side entry, and the server-side entry may forward the location status report to the user terminal M. The user terminal M may display the location and the status in the location status report (that is, the current location and the current status of the necklace) on the display interface, and the user M can check the location and the status of the necklace.

Figure 3:
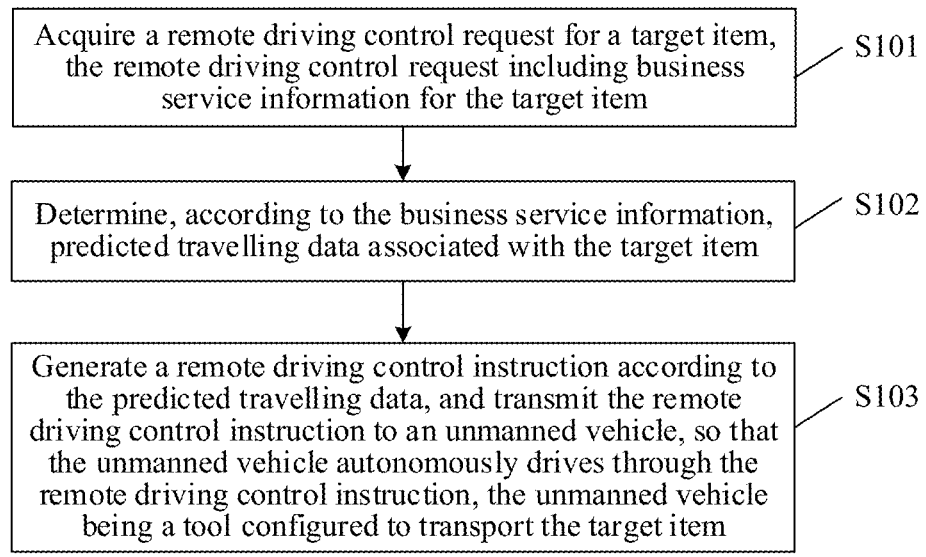
FIG. 3 is a schematic flowchart of a business data processing method according to an embodiment of this disclosure.

For ease of understanding, FIG. 3 is a schematic flowchart of a business data processing method according to an embodiment of this disclosure. The method may be jointly performed by the user terminals (for example, the user terminals shown in FIG. 1 and FIG. 2), the server-side entries (for example, the server-side entries shown in FIG. 1 and FIG. 2), the remote control platform (such as the remote control platform in the embodiment corresponding to FIG. 1), and the business service backend (such as the business service backend in the embodiment corresponding to FIG. 1). The business data processing method may include at least the following S101-S103.

S101: Acquire a remote driving control request for a target item, the remote driving control request including business service information of the target item. For example, a delivery request for an item may be acquired, the delivery request comprising delivery information of the item.

In this disclosure, when a user uses a target application (such as a shopping application) in the user terminal, the user may initiate a shopping request or a delivery request for a certain item in the target application, and the user terminal may transmit the shopping request or the delivery request to the server-side entry. Then the server-side entry may acquire information such as receiving address information of the user (that is, destination-of-delivery address information of the necklace), user information (for example, information such as a user name of a receiving user, contact information, and the like), ship-from address information of the necklace (that is, origin-of-delivery address information of the necklace), and the item attribute according to the request. Then the server-side entry may use the item as the target item and generate a transport business request for the target item, and transmit the transport business request to the business service backend together with the receiving address information, the ship-from address information, the item attribute, and the user information.

Subsequently, the business service backend may generate the business service information according to the transport business request, and generate a remote driving request according to the business service information. The specific method for generating the remote driving request by the business service backend may be as follows. The business service backend may first acquire the transport business request (that is, the transport request generated according to the shopping request or the delivery request of the user) for the target item, and then may acquire the item attribute and the travelling address information of the target item (which may include the receiving address information and the ship-from address information of the item) in the transport business request. The business service backend may acquire an initial transport time range corresponding to the travelling address information according to a business configuration rule, may generate the business service information for the target item according to the travelling address information, the initial transport time range, and the item attribute, and then may generate the remote driving control request including the business service information.

The item attribute may be a volume attribute (an item volume), a weight attribute (an item weight), a quantity attribute (an item quantity), and the like of the target item. It is to be understood that if the item has a large volume or is heavy, or the quantity of items is large, additional delay may be introduced for loading/unloading a transport vehicle, and the like during the transport of the target item. Therefore, when the item has a large volume or is heavy, or the quantity of items is large, a time limit requirement for the item transport may be appropriately modified. That is to say, on the basis of the initial transport time range, the transport waiting time range is expanded to obtain an expected transport time range, and the business service information is generate according to the expected transport time range. The item attribute including the item volume is used as an example below to describe the specific implementation of generating the business service information for the target item according to the travelling address information, the initial transport time range, and the item attribute. First, the transport waiting time range corresponding to the target item may be determined according to a volume range to which the item volume belongs. Then the initial transport time range and the transport waiting time range may be added up to obtain the expected transport time range of the target item. The business service information for the target item may be generated according to the travelling address information, the item attribute, and the expected transport time range.

It is to be understood that the business configuration rule may be a negotiation configuration of a policy related to service for the target item between the server-side entry and the business service backend. The significance of the business configuration rule is to support authentication and billing between the server-side entry and the business service backend, and configure the service content and the QoS of the target item.

The business configuration rule may include, but is not limited to, the following content: business classification, a location-based service, a big data service, a billing service, and an authentication service.

Business classification: the business classification may be applicable to business service backends that are separately and independently deployed. That is to say, the business service backend may be classified into a business service backend A and a business service backend B. The business service backend A mainly provides services for toC (consumer-oriented) businesses (the logistics service for items having small volumes and small weights and for a small number of items). The business service backend B mainly provides services for toB (business-oriented) businesses (the logistics service for items having large volumes or large weights or for a large number of items).

Location-based service: the location-based service is mainly configured to extract location information. That is to say, the business service backend may extract information about locations from the transport business request (for example, the business service backend may extract the receiving address information and the ship-from address information) after receiving the transport business request from the server-side entry, and generate the business service information from the extracted location information.

Big data service: the big data service is mainly configured to analyze an expected transport time (the initial transport time range) required for transporting the target item from an originating address to a receiving address, a probability that the expected transport time can satisfy the customer, and the like.

Billing service: the billing service is mainly configured to interact with the business service backend, and execute the billing function according to a specific billing policy for the unmanned logistics service. For example, the business service backend is a logistics service backend corresponding to an express company. The logistics service backend has a specific billing policy. If the logistics service of the express company is to be used for transport, a billing policy of the logistics service backend corresponding to the express company is required to be adopted for billing.

Authentication service: the authentication service is mainly configured to authenticate the business service backend to avoid forgery and denial.

It is to be understood that the server-side entry may perform business classification on the business of the target item according to the item attribute after receiving the shopping request for the target item from the user. If the target item has the attribute such as a small volume, a small weight, or a small quantity, the business of the target item may be classified as a toC business. Then the server-side entry may generate a transport business request and transmit the transport business request to a toC business service backend (which has been authenticated). Then the toC business service backend may acquire the location information (for example, the receiving address information, the ship-from address information, and the like) associated with the target item according to the business configuration rule, calculate the expected transport time according to the business configuration rule, and execute the billing function according to the business configuration rule. That is to say, according to the business configuration rule, the toC business service backend may extract the location information, determine the expected transport time, and calculate transport expenses, and generate the business service information from the location information, the expected transport time, and the calculated transport expenses. Then the toC business service backend may generate a remote driving control request according to the business service information, and transmit the remote driving control request to the business server.

Similarly, it is to be understood that if the target item has the attributes such as a large volume, a large weight, or a large quantity, the server-side entry may classify the business of the target item as the toB business. The server-side entry may also generate the transport business request and transmit the transport business request to the toB business service backend. Then the toB business service backend may also execute functions such as the location extraction, the determination of the expected transport time, and the execution of billing according to the business configuration rule, and generate the business service information including the location information, the expected transport time, and the transport expenses.

It is to be understood that item having the item attributes such as a large volume or a large weight or a large number may cause transport pressure on the vehicle, the road, and the information network resource during the transport, and may be required to queue for transport or delay transport. In a case that the queuing for the transport or the delaying transport is required, the business service backend may generate a prompt message for reduction of the time limit requirement (a prompt message for extension of the expected transport time), and display the prompt information for the reduction of the time limit requirement on the display interface of the user terminal to remind the user that the time limit requirement may be reduced (the expected transport time may be extended). If the user decides to reduce the time limit requirement, the user may be given corresponding incentives such as expenses (that is, part of the transport costs is reduced). In this way, the updated expected transport time (the expected transport time range) and the updated transport expenses can be obtained, so that the business service information including the location information (the travelling address information), the expected transport time range, and the updated transport expenses can be generated.

In a possible implementation, it may be understood that the business service backend may also be deployed uniformly. That is to say, the business classification is no longer performed according to the item attribute. After the server-side entry receives the shopping request of the user, the transport business request is generated, and the unified business service backend is adopted for service.

S102: Determine, according to the business service information, predicted travelling data associated with the target item. For example, predicted travelling data associated with delivering the item may be determined according to the delivery information and at least one of network coverage or network connection quality associated with the predicted travelling data may be determined according to the delivery information.

In this disclosure, the remote control platform may receive the remote driving request from the business service backend, and determine the predicted travelling data associated with the target item according to the business service information in the remote driving request. The predicted travelling data may include a predicted travelling route and a predicted travelling time. When the predicted travelling data includes the predicted travelling route, the specific method for determining the predicted travelling route associated with the target item according to the business service information may be: first acquiring the travelling address information and the expected transport time range in the business service information; then determining an initial predicted travelling route of the target item according to the travelling address information; and then determining a predicted travelling time range corresponding to the initial predicted travelling route, and determining the initial predicted travelling route as the predicted travelling route corresponding to the target item in a case that the predicted travelling time range is within the expected transport time range.

It is to be understood that when the remote control platform predicts the travelling route of the target item (that is, obtains the predicted travelling route), the travelling time of the predicted travelling route is required to meet the time limit requirement (that is, the expected transport time range) in the business service information (delivery information). If the initial predicted travelling routes determined by the business server include an initial predicted travelling route 1 and an initial predicted travelling route 2. A predicted travelling time range of the initial predicted travelling route 1 is 11:00-12:00, and a predicted travelling time range of the initial predicted travelling route 2 is 11:00-15:00. Since the predicted travelling time range 11:00-15:00 is not within the expected transport time range 10:00-14:00, it may be determined that the initial predicted travelling route 2 does not meet the time limit requirement, the initial predicted travelling route 2 may be eliminated, and the initial predicted travelling route 1 may be used as a final predicted travelling route.

It is to be understood that if a plurality of initial predicted travelling routes determined by the remote control platform all meet the time limit requirement, one of the plurality of initial predicted travelling routes having the smallest predicted travelling time range may be selected as the final predicted travelling route of the target item. For example, the initial predicted travelling routes determined by the remote control platform include an initial predicted travelling route 1 and an initial predicted travelling route 2. A predicted travelling time range of the initial predicted travelling route 1 is 11:00-12:00, and a predicted travelling time range of the initial predicted travelling route 2 is 11:00-12:30. Since the predicted travelling time ranges 11:00-12:00 and 11:00-12:30 are both within the expected transport time range 10:00-14:00, it may be determined that both the initial predicted travelling route 1 and the initial predicted travelling route 2 meet the time limit requirement. However, since the predicted travelling time range 11:00-12:00 is smaller than the predicted travelling time range 11:00-12:30, the initial predicted travelling route 1 may be used as the final predicted travelling route.

When the predicted travelling data includes the predicted travelling time, the specific method for determining the predicted travelling time associated with the target item according to the business service information may be: first acquiring the expected transport time range in the business service information; then acquiring a congested travelling time period within a specified travelling time period, the congested travelling time period being a time period with a congested travelling probability greater than a probability threshold; deleting the congested travelling time period in the specified travelling time period to obtain a candidate travelling time period; and selecting a predicted travelling time period of the target item from the candidate travelling time period, and determining, as the predicted travelling time of the target item, a travelling time composed of the predicted travelling time period, the predicted travelling time being within the expected transport time range.

It is to be understood that when the travelling time period for transporting the target item is selected, morning and evening peaks can be avoided. That is to say, the time period during which the traffic congestion is easily caused can be avoided, thereby reducing the traffic congestion.

In a possible implementation, it may be understood that, the specific method for determining, by the remote control platform, the predicted travelling data associated with the target item according to the business service information may further be: acquiring the travelling address information and the expected transport time range in the business service information; acquiring, from the network configuration rule, a network coverage and network connection quality associated with the travelling address information and the expected transport time range; and performing transport dispatching on the target item according to the item attribute, the travelling address information, the expected transport time range, and the network coverage and the network connection quality associated with the travelling address information and the expected transport time range, to obtain the predicted travelling data. The predicted travelling data may include a predicted travelling route and a predicted travelling time. It is to be understood that this disclosure formulates a network configuration rule. In the network configuration rule, the network coverage is allocated to a travelling region and a travelling time period, and the network connection quality is specified for the travelling region and the travelling time period. Therefore, the network coverage and the network connection quality corresponding to each travelling region may be determined through the network configuration rule, and the coverage and the network connection quality corresponding to each travelling time period may also be determined. In this way, the network coverage and the network connection quality associated with the predicted travelling data (including the predicted travelling route or the predicted travelling time) may be determined through the network configuration rule. For the specific content specified and configured by the network configuration rule, and the specific method for determining the network coverage and the network connection quality corresponding to the candidate predicted travelling data according to the network configuration rule, reference may be made to the subsequent description.

That is to say, it may be understood that, in this disclosure, in the determination of the predicted travelling route of the target item, the initial predicted travelling route may be determined according to a travelling origin and a travelling destination, and then a route that meets the expected transport time range can be determined from these initial predicted travelling routes as a candidate travelling route. Further, a target transport safety level may be determined according to the item attribute of the target item. For example, the item attribute is a large item volume and a large item weight, which easily causes pressure on the transport road, and therefore a target transport safety level (for example, 8) may be determined according to the item volume and the item weight. Further, a transport safety level of the target item in these candidate travelling routes may be determined, and the candidate travelling route that meets the target transport safety level is determined. For example, the candidate travelling routes include a candidate travelling route 1 and a candidate travelling route 2. A security level for transporting the target item in the candidate travelling route 1 is 9, and a security level for transporting the target item in the candidate travelling route 2 is 9. Therefore, the transport safety level of the target item in the candidate travelling route 1 and the candidate travelling route 2 both satisfy the target transport safety level of 8, and then both the candidate travelling route 1 and the candidate travelling route 2 can be used as routes for transporting the target item. Further, the final predicted travelling route of the target item may be determined according to the network coverage and the network connection quality corresponding to the candidate travelling route (for example, a candidate travelling route having a larger network coverage and higher network connection quality may be selected as the final predicted travelling route).

It may be understood that when the transport safety levels of the target item in the candidate travelling route are consistent and meet the target transport safety level, the final predicted travelling route may be determined according to the network coverage and the network connection quality corresponding to the candidate travelling route. However, if the transport safety levels of the target item in the candidate travelling route are inconsistent and meet the target transport safety level, an optimal final predicted travelling route may be selected according to the transport safety levels (for example, a travelling route with a higher transport safety level), without considering the network coverage and the network connection quality corresponding to the candidate travelling routes.

In a possible implementation, it may be understood that according to the foregoing description, the candidate travelling route is determined according to the expected transport time range, and then the final predicted travelling route is determined according to the target transport level and the network coverage and the network connection quality corresponding to the candidate travelling route. The predicted travelling route may further be generated by comprehensively considering the expected transport time range, the item attribute, the network coverage, and the network connection quality. That is to say, a route origin and a route destination may be determined according to the travelling address information, so that the travelling region between the route origin and the route destination can be acquired. A target travelling region is selected according to the network coverage and the network connection quality and the transport safety level of the target item in these travelling regions. The network coverage of these target travelling regions is relatively large and the quality level of the network connection quality is relatively high, and the transport safety levels of the target item in these target travelling regions all meet the target transport safety level. Then the final predicted travelling route may be generated according to the expected transport time range and these target travelling regions.

It may be understood that in this disclosure, when the travelling time period for transporting the target item is selected, morning and evening peaks can be avoided. That is to say, the time period during which the traffic congestion is easily caused can be avoided, thereby reducing the traffic congestion. A target travelling time period may be determined from the remaining travelling time periods. The network coverage of these target travelling time periods is relatively large and the quality level of the network connection quality is relatively high, and the transport safety levels of the target item in these target time periods all meet the target transport safety level. The predicted travelling time period for forming the predicted travelling time that meets the expected transport time range may be selected from these target travelling time periods.

It is to be understood that according to this disclosure, transport dispatching is performed on the travelling route and the travelling time of the target item according to the item volume, the item weight, the transport safety, and the destination of the target item, and the network coverage and the network connection quality specified and configured by the network configuration rule. For example, there is no significant difference between a volume, a weight, and transport safety of an item A and a volume, a weight, and transport safety of an item B, and destinations of the two items are the same, so that the item A and the item B can be aggregated in a certain region for unified transport, thereby saving transport resources.

In a possible implementation, the foregoing business service backend may be integrated and deployed in the remote control platform in the form of functional modules, so that the remote control platform can also execute the functions executed by the business service backend.

S103: Generate a remote driving control instruction according to the predicted travelling data, transmit the remote driving control instruction to an unmanned vehicle, so that the unmanned vehicle autonomously drives through the remote driving control instruction, the unmanned vehicle being a tool configured to transport the target item. For example, the remote driving control instruction may be transmitted to an unmanned vehicle using the allocated network resources, so as to cause the unmanned vehicle to drive based on the remote driving control instruction, the unmanned vehicle being configured to transport the item.

In a possible implementation, after the predicted travelling data associated with the target item is determined according to the business service information, a QoS parameter corresponding to the predicted travelling data may further be acquired according to the network configuration rule, and a network communication resource indicated by the QoS parameter is allocated to the unmanned vehicle. In this way, transmitting the remote driving control instruction to the unmanned vehicle may actually mean transmitting the remote driving control instruction to the unmanned vehicle to which the network communication resource is allocated. In this way, the network communication resource can be properly used while the network supports the remote control of the unmanned vehicle for driving, which can increase the reliability of the unmanned driving, and provide unmanned delivery service for the items based on the remote driving technology and the network communication.

In this disclosure, the unmanned vehicle may be any driving terminal in the driving terminal cluster shown in the embodiment corresponding to FIG. 1. For example, the unmanned vehicle may be the driving terminal 1000a. The remote control platform may acquire the QoS parameter corresponding to the predicted travelling data according to the network configuration rule. The QoS parameter may include a network coverage and network connection quality. The specific method for acquiring the QoS parameter corresponding to the predicted travelling data according to the network configuration rule may be as follows. The QoS parameter may be acquired from the network configuration rule according to the predicted travelling data. The QoS parameter includes a specified target network coverage and specified target network connection quality. The network communication resource configured to realize the target network coverage and the target network connection quality may be allocated to the unmanned vehicle according to a target base station indicated by the target network coverage and the target network connection quality. The target base station is located in a region through which travelling is carried out based on the predicted travelling data.

When the predicted travelling data is the predicted travelling route, the specific method for acquiring the QoS parameter corresponding to the predicted travelling route according to the network configuration rule may be: first acquiring a set of specified travelling regions in the network configuration rule, the set of specified travelling regions including at least two pieces of region information and the network coverage and the network connection quality specified for each piece of region information; then acquiring at least one predicted travelling region included in the predicted travelling route, matching the at least one predicted travelling region with the set of specified travelling regions, and determining target region information from the at least two pieces of region information, and the target region information encompassing the predicted travelling region; and then determining the network coverage specified by the target region information as the target network coverage of the predicted travelling region, and determining, as the target network connection quality of the predicted travelling region, the network connection quality specified for the target region information.

When the predicted travelling data is the predicted travelling time, the specific method for acquiring the QoS parameter corresponding to the predicted travelling time according to the network configuration rule may be: first acquiring a set of specified time periods in the network configuration rule, the set of specified time periods including at least two specified time periods and the network coverage and the network connection quality specified for each specified time period; then matching the predicted travelling time with the set of specified time periods, and determining a target specified time period from the at least two specified time periods, the predicted travelling time being within the target specified time period; and then determining, as the target network coverage of the predicted travelling time, the network coverage specified for the target specified time period, and determining, as the target network connection quality of the predicted travelling time, the network connection quality specified for the target specified time period.

It is to be understood that in this disclosure, network-related policy configuration is performed between a network deployer (for example, an operator deployer and a network base station) and the remote control platform. That is to say, the network configuration rule is formulated between the two parties. The significance of the network configuration rule is that a specified network (for example, the 5th Generation Mobile Communication (5th generation mobile networks, 5G) network) can provide an SLA parameter suitable for the unmanned delivery service. The network configuration rule includes but is not limited to the following 3 rules.

1. Allocate the network coverage to the travelling region and specify the network connection quality. For example, for S City, an S1 Region of S City is prosperous, there are many vehicles passing the road, and therefore the network connection quality of the S1 region is required to be good, so that the unmanned vehicle configured to transport the target item has a strong network connection signal, so as to quickly and accurately receive a remote control instruction. Therefore, the network coverage specified and configured for the S1 Region in the S City is an entire S1 region, and the specified and configured network connection quality level is relatively high. For an S2 region of the S city, there are few roads and few vehicles passing in the S2 region, and therefore there is no need to ensure excellent network connection quality. Therefore, the specified and configured network coverage of S2 Region in S City is the entire S2 region, but the specified and configured network connection quality level is not as good as the network connection quality level of the S1 Region.

2. Allocate the network coverage for the travelling time period and specify the network connection quality. It is to be understood that different road conditions such as the travelling region and the road where the unmanned vehicle is located vary with different time periods. For example, during the morning and evening peaks of commuting, traffic congestion occurs in region A, and beyond the morning and evening peaks of commuting, the traffic congestion does not occur in the region A. Therefore, it is necessary to configure different network coverages for different time periods and specify different network connection quality. A higher level of network connection quality is configured during the time period during which the traffic congestion with many vehicles is easily caused.

3. Configure a remote control mode for the unmanned vehicle. The remote control mode may include a control-by-wire mode and a route guidance mode. A network communication module may be installed for the unmanned vehicle, and the business server (the network remote control platform) may directly apply the driving instruction of controlling the driving control module of the unmanned vehicle through the control-by-wire mode. It is to be understood that the control-by-wire mode is suitable for the road having a complex road condition. That is to say, if the road condition of the predicted travelling route has relatively high complexity, the remote control mode of the unmanned vehicle may be determined as the control-by-wire mode. The control-by-wire mode is also suitable for a scenario where an autonomous driving function level of the unmanned vehicle is relatively low.

However, if the road condition of the predicted travelling route has relatively low complexity, and the autonomous driving function level of the unmanned vehicle is relatively high, the remote control mode of the unmanned vehicle may be determined as the route guidance mode.

It is to be understood that the remote control platform may determine the predicted travelling route according to the travelling address information in the business service information. Subsequently, the predicted travelling region included in the predicted travelling route may be acquired, and the predicted travelling region may be compared with the travelling region in the network configuration rule. The network coverage corresponding to the travelling region covering the predicted travelling region in the network configuration rule is used as the target network coverage of the predicted travelling region, and the network connection quality corresponding to the travelling region covering the predicted travelling region in the network configuration rule is used as the target network connection quality of the predicted travelling region. The target network coverage and the target network connection quality of the entire predicted travelling route may be determined by determining the target network coverage and the target network connection quality of each predicted travelling region.

In addition, the remote control platform may also determine the predicted travelling time according to the expected transport time range in the business service information. Then the predicted travelling time may be compared with the specified time period in the network configuration rule. The network coverage corresponding to the specified time period including the predicted travelling time in the network configuration rule is used as the target network coverage of the predicted travelling time, and the network connection quality corresponding to the specified time period including the predicted travelling time in the network configuration rule is used as the target network connection quality of the predicted travelling time. For example, the predicted travelling time is 12:00-14:00 (the predicted travelling time is composed of the predicted travelling time period 12:00-13:00 and the predicted travelling time period 13:30-14:00), and the predicted travelling time 12:00-14:00 is within the travelling time period 11:00-14:00 in the network configuration rule. The network coverage and the network connection quality specified for the time period 11:00-14:00 in the network configuration rule may be acquired. The network coverage specified for the specified time period 11:00-14:00 is used as the target network coverage corresponding to the predicted travelling time 12:00-14:00, and the network connection quality specified for the travelling time period 11:00-14:00 is used as the target network connection quality corresponding to the predicted travelling time 12:00-14:00.

In this disclosure, the remote driving control instruction may include a first driving instruction and a second driving instruction. The specific method for generating the remote driving control instruction according to the predicted travelling data by the remote control platform may be acquiring a road condition complexity corresponding to the predicted travelling data, and determining, according to the network configuration rule and the road condition complexity, a remote control mode of the unmanned vehicle. It is to be understood that the first driving instruction may be generated according to the predicted travelling data in a case that the remote control mode is the control-by-wire mode. The first driving instruction is used for providing a driving direction and a driving speed for the unmanned vehicle. The second driving instruction may be generated according to the predicted travelling data in a case that the remote control mode is the route guidance mode. The second driving instruction is used for providing travelling route information for the unmanned vehicle. The travelling route information is used for guiding the unmanned vehicle to obtain the driving direction and the driving speed through analysis.

It is to be understood that since the remote control mode (including the control-by-wire mode and the route guidance mode) of the unmanned vehicle is configured in the network configuration rule, the remote control mode of the unmanned vehicle configured to transport the target item may be determined according to the remote control mode specified and configured in the network configuration rule. Different remote driving control instructions may be generated according to different remote control modes. The specific method for determining the remote control mode of the unmanned vehicle according to the network configuration rule and the road condition complexity may be: first acquiring a specified remote control mode in the network configuration rule, the specified remote control mode including the control-by-wire mode and the route guidance mode; determining the remote control mode of the unmanned vehicle as the control-by-wire mode in a case that the road condition complexity is greater than a complexity threshold; acquiring an autonomous driving function level of the unmanned vehicle in a case that the road condition complexity is less than or equal to the complexity threshold, and determining the remote control mode of the unmanned vehicle as the control-by-wire mode in a case that the autonomous driving function level does not satisfy an unmanned driving condition; and determining the remote control mode of the unmanned vehicle as the route guidance mode in a case that the autonomous driving function level satisfies the unmanned driving condition.

In a possible implementation, it may be understood that, during the transport of the target item by the unmanned vehicle, the network connection quality of the unmanned vehicle may be dynamically detected. That is, when the remote control mode of the unmanned vehicle is the control-by-wire mode, the network connection quality of the unmanned vehicle may be detected. A stop driving instruction may be generated in a case that a quality level corresponding to the network connection quality of the unmanned vehicle is lower than a level threshold, and the stop driving instruction is transmitted to the unmanned vehicle, so that the unmanned vehicle is switched from a driving state to a stop driving state through the stop driving instruction. That is to say, during the transport of the target item by the unmanned vehicle, if it is detected that the network connection quality is degraded, the unmanned vehicle may be parked nearby to avoid an accident.

In a possible implementation, it may be understood that the network connection quality of the unmanned vehicle is detected if the remote control mode of the unmanned vehicle is the control-by-wire mode. If the quality level corresponding to the network connection quality of the unmanned vehicle is lower than the level threshold, and the autonomous driving function level of the unmanned vehicle satisfies the unmanned driving condition, a mode switching instruction may be generated, and the mode switching instruction is transmitted to the unmanned vehicle to switch the remote control mode from the control-by-wire mode to the route guidance mode through the mode switching instruction. It is to be understood that, during the transport of the target item by the unmanned vehicle, if it is detected that the network connection quality is degraded, a mode switching policy may be performed on the unmanned vehicle that satisfies the unmanned driving condition, so that the unmanned vehicle autonomously drives according to the route without relying on the network communication resource to receive the control instruction including the driving direction, so that the accident can be avoided.

It may be understood that the business configuration rule specifies and configures different billing policies. Similarly, the network configuration rule also specifies and configures different resource billing policies. Different travelling regions or travelling time periods correspond to different network coverages and different network connection quality, and the different network coverage and different network connection quality also correspond to different resource prices. Therefore, in this disclosure, final transport expenses of the target item may be determined according to the billing policy in the business configuration rule and the billing policy in the network configuration rule. The specific method for determining the final transport expenses of the target item may be: first acquiring a first consumable virtual asset (the transport expenses) for transporting the target item in the business service information, then acquiring a specified virtual asset specified for the QoS parameter in the network configuration rule, and using the specified virtual asset as a second consumable virtual asset for transporting the target item; and then determining, according to the first consumable virtual asset and the second consumable virtual asset, a target consumable virtual asset for transporting the target item.

In a possible implementation, it may be understood that, after the unmanned vehicle completes the transport of the target item, quality evaluation may be performed on the transport process of the unmanned vehicle this time, and the overall unmanned logistics service is optimized according to the evaluation result (for example, the SLA parameter specified in the network configuration rule and the business configuration rule are optimized, and the like). The specific method for performing quality evaluation on the transport process of the unmanned vehicle to generate the evaluation result may be: acquiring a data statistics report associated with the unmanned vehicle and the target item in a case that the unmanned vehicle completes the transport of the target item, the data statistics report including a network coverage and network connection quality on which statistics are collected by the unmanned vehicle during the transport; and transmitting the data statistics report to a user terminal, so that the user terminal generates a driving quality score through the network coverage and the network connection quality on which statistics are collected during the transport, and generating the evaluation result according to the driving quality score.

In the embodiments of this disclosure, a remote driving technology is introduced in delivery services for items, so as to control the unmanned vehicle to transport the items, thereby realizing unmanned delivery of the items, and saving a lot of labor costs. The item is a target item by way of example. A remote driving control request for a target item is acquired, and predicted travelling data associated with the target item is determined according to business service information in the remote driving control request, to generate a remote driving control instruction according to the predicted travelling data. The remote driving control instruction is transmitted to an unmanned vehicle, so that the unmanned vehicle can autonomously drive through the remote driving control instruction. It can be learned that this disclosure may provide an unmanned delivery service for the item based on the remote driving technology. The unmanned delivery is combined with the unmanned driving to realize personalized smart logistics based on the remote driving technology and realize full automation without manual participation, so as to save logistics costs.

In addition, in this process, the network configuration rule is set, and different items correspond to different predicted travelling data. Different network communication resources may be configured for the unmanned vehicle according to the network configuration rule and the different predicted travelling data, so that the unmanned vehicle is within the network coverage on the travelling route between a driving origin and a driving destination and is connected to the network, and can be remotely controlled to travel by the network. In addition, the network communication resource may further be properly utilized. It can be seen that this disclosure may provide an unmanned delivery service for the item based on the remote driving technology and network communication. The unmanned delivery is combined with the unmanned driving to realize personalized smart logistics based on the remote driving technology and realize full automation without manual participation, so as to save logistics costs. It can be seen that when the network communication is the 5G network, this disclosure can provide the unmanned delivery service for the item based on the remote driving technology supported by the 5G, thereby realizing personalized smart logistics based on the 5G system.

Figure 4:
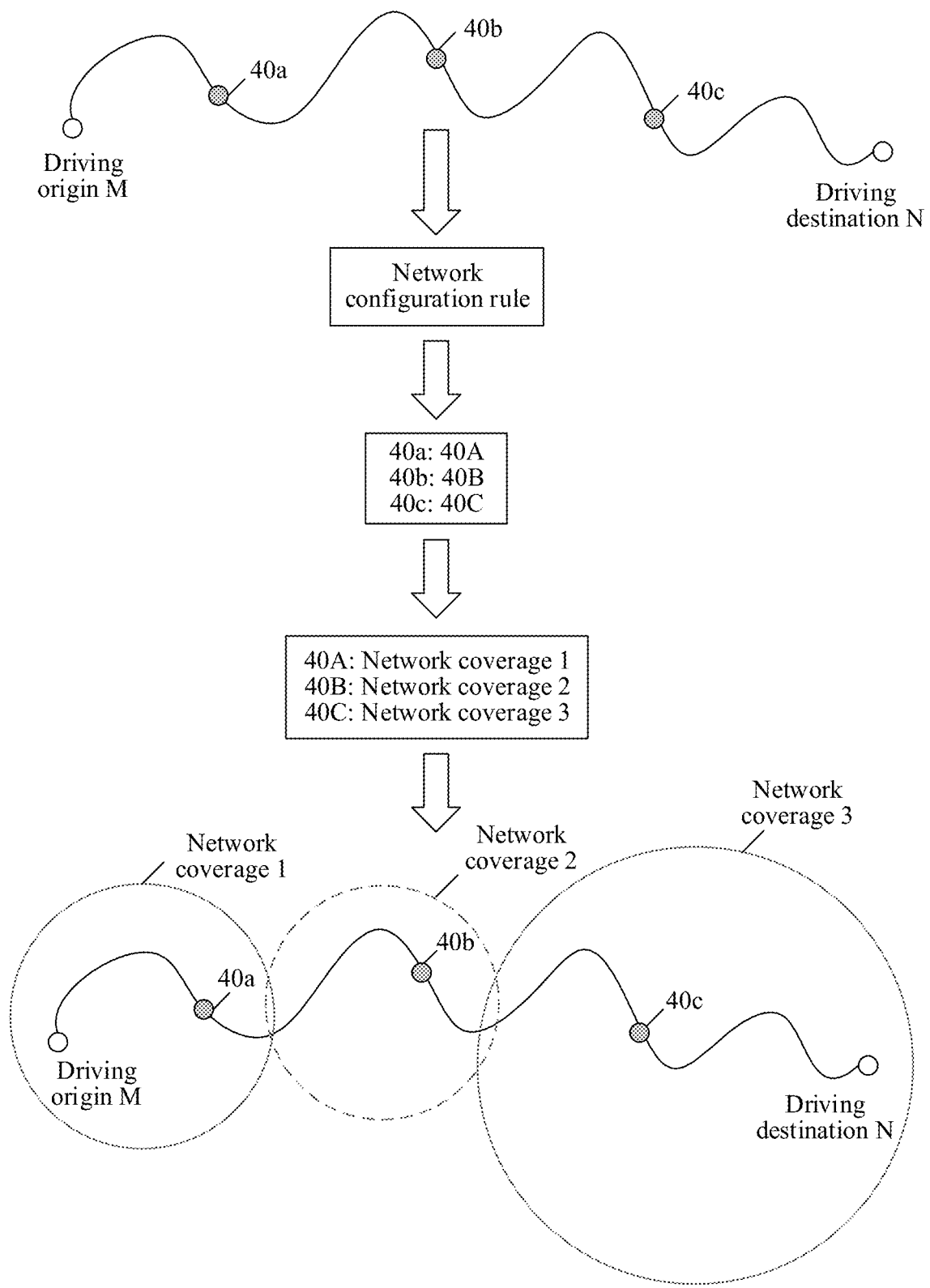
FIG. 4 is a schematic diagram of a scenario where a network communication resource is allocated according to an embodiment of this disclosure.

For ease of understanding, FIG. 4 is a schematic diagram of a scenario where a network communication resource is allocated according to an embodiment of this disclosure. As shown in FIG. 4, the predicted travelling route from a driving origin M to a driving destination N includes three predicted travelling regions: a predicted travelling region 40a, a predicted travelling region 40b, and a predicted travelling region 40c. Subsequently, a plurality of specified travelling regions in the network configuration rule may be acquired, and the specified travelling region covering the predicted travelling region 40a, the specified travelling region covering the predicted travelling region 40b, and the specified travelling region covering the predicted travelling region 40c may be acquired from the plurality of specified travelling regions. As shown in FIG. 4, the specified travelling region covering the predicted travelling region 40a is a specified travelling region 40A, the specified travelling region covering the predicted travelling region 40b is a specified travelling region 40B, and the specified travelling region covering the predicted travelling region 40c is a specified travelling region 40C.

In addition, the network coverage (a network coverage 1 shown in FIG. 4) specified and configured for the specified travelling region 40A may be acquired from the network configuration rule, and the network coverage 1 may be used as the network coverage of the predicted travelling region 40a. Similarly, the network coverage (a network coverage 2 shown in FIG. 4) specified and configured for the specified travelling region 40B may be acquired, and the network coverage 2 may be used as the network coverage of the predicted travelling region 40b. Similarly, the network coverage (a network coverage 3 shown in FIG. 4) specified and configured for the specified travelling region 40C may be acquired, the network coverage 3 may be used as the network coverage of the predicted travelling region 40c. Thus, a total network coverage of the predicted travelling route from the driving origin M to the driving destination N may be determined (as shown in FIG. 4, the total network coverage includes the network coverage 1, the network coverage 2, and the network coverage 3).

It is to be understood that the network connection quality is also specified and configured for each specified travelling region in the network configuration rule. For example, when the unmanned vehicle is within the network coverage 1, the corresponding network connection quality is the network connection quality of the specified travelling region 40A, and the network communication resource allocated to the unmanned vehicle is also the network connection quality corresponding to the network coverage 1. When the unmanned vehicle is within the network coverage 2, the corresponding network connection quality is the network connection quality of the specified travelling region 40B, and the network communication resource allocated to the unmanned vehicle is also the network connection quality corresponding to the network coverage 2. When the unmanned vehicle is within the network coverage 3, the corresponding network connection quality is the network connection quality of the specified travelling region 40C, and the network communication resource allocated to the unmanned vehicle is also the network connection quality corresponding to the network coverage 3.

Figure 5:
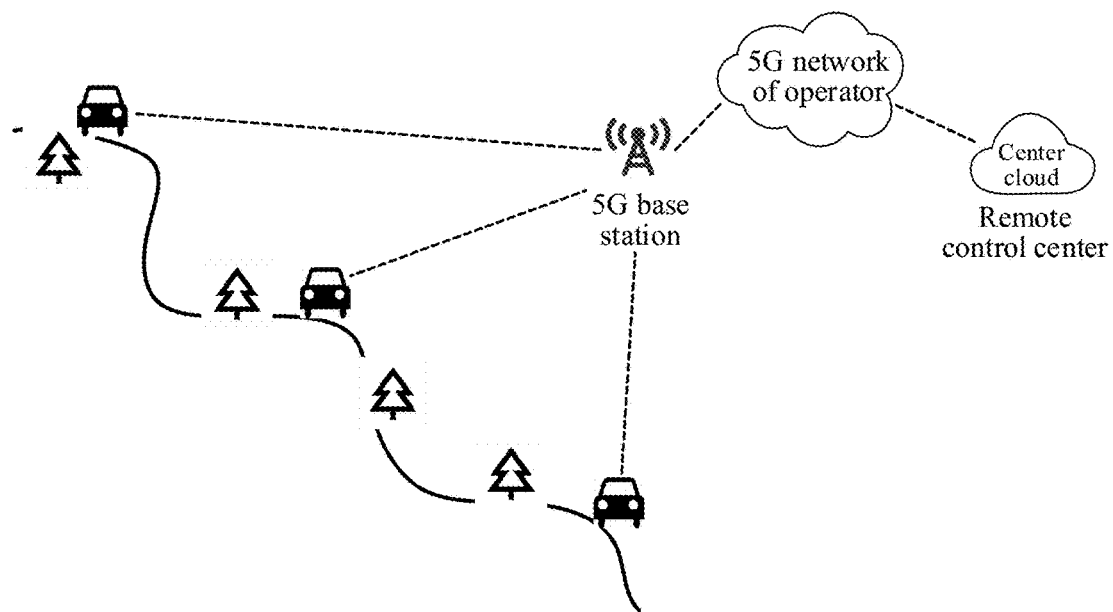
FIG. 5 is a scenario architecture diagram of remote driving according to an embodiment of this disclosure.

FIG. 5 is a scenario architecture diagram of remote driving according to an embodiment of this disclosure. As shown in FIG. 5, the scenario architecture is described by using the network as a 5G network by way of example.

The scenario architecture diagram may include a 5G network of an operator, a remote control center (a remote control platform), a 5G base station, and each unmanned vehicle (a driving terminal). The 5G network of the operator may provide a reliable 5G network connection for the remote control center of remote driving, and the reliable 5G network connection is required to be provided by a communication data (Protocol Data Unit, PDU) session with hard quality of service (QoS) assurance provided by the 5G network. That is to say, the remote control center may control the unmanned vehicle to autonomously drive. In this process, the reliable 5G connection is provided for the remote control center mainly through the PDU session with hard QoS assurance provided by the 5G network of the operator. The 5G base station may be instructed through the 5G connection to allocate the network communication resource to the unmanned vehicle, so that the remote control center can control, to autonomously or remotely drive, the unmanned vehicle to which the network communication resource is allocated.

In a possible implementation, it may be understood that the 5G network in the foregoing scenario architecture diagram is deployed by the operator by way of example for description, but the 5G network may also be deployed by other deployers, which is not limited in this disclosure.

Figure 6:
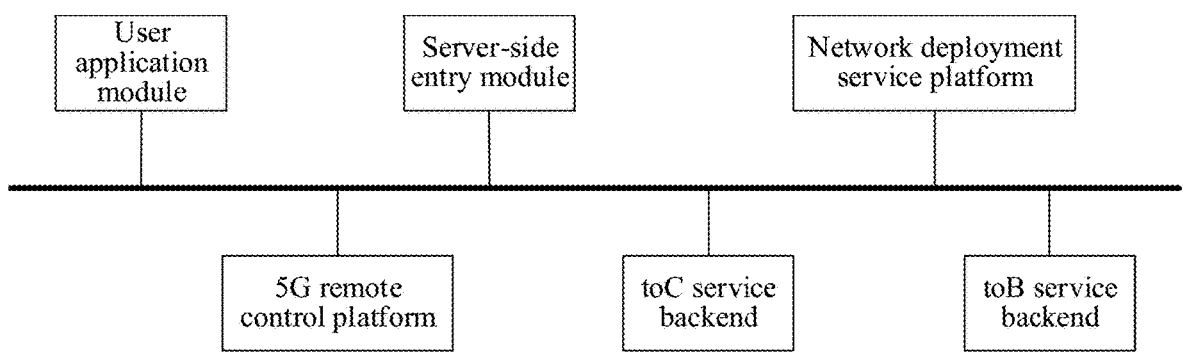
FIG. 6 is a diagram of a functional architecture of an unmanned delivery service system according to an embodiment of this disclosure.

In a possible implementation, FIG. 6 is a diagram of a functional architecture of an unmanned delivery service system according to an embodiment of this disclosure. As shown in FIG. 6, the functional architecture may include a user application module, a server-side entry, a network deployer policy and service platform, a 5G remote control platform, a toC service backend, and a toB service backend. Interfaces among modules shown in FIG. 6 are connected through a bus. It is to be understood that service-based architecture (SBA) interfaces may be adopted among the modules shown in FIG. 6. The functions corresponding to the modules shown in FIG. 6 are to be described below.

The user application module may be any application that may generate a delivery demand, for example, a shopping application, an ordering application, or the like. User application module: the user application module may be used by a user to initiate a delivery demand for any item.

Server-side entry module: the server-side entry module is mainly configured to receive a business request of the user application, and then initiate the business request to the toC service backend or the toB service backend. It is to be understood that the server-side entry module can classify the business requests into toC businesses or toB businesses, and distribute the business to the toC service backend or the toB service backend. For the specific method for classifying the business requests by the server-side entry, reference may be made to the description of performing the business classification by the server-side entry in S101 in the embodiment corresponding to FIG. 3, and the details are not described herein again.

It is to be understood that if server-side entries are deployed separately, that is, one server-side entry corresponds to one business service backend, the server-side entry is not required to classify the business requests after receiving the business requests, but only required to transmit the business requests to the corresponding service backend.

toC service backend and toB service backend: the toC service backend and the toB service backend are generic terms of services other than the 5G remote control platform, including a location-based service, a big data service, a billing service, an authentication service, and the like. The toC service backend mainly provides services for toC businesses, and mainly receives a toC business request generated by the server-side entry. The toB service backend mainly provides services for toB businesses, and mainly receives a toB business request generated by the server-side entry. For ease of understanding, various services provided by the toC service backend and the toB service backend are to be described below.

Location-based service: the location-based service is configured to extract information about locations from the received toC business request or toB business request from the server-side entry, and generate data available for the 5G remote control platform to initiate an unmanned delivery request.

Big data service: the big data service may be configured to analyze an expected delivery time of the delivery service and an expected probability that the customer can be satisfied.

Billing service: the billing service is configured to execute the billing function according to a specific billing policy.

Authentication service: the authentication service is configured to authenticate a toC server side or a toB server side to avoid forgery and denial.

It is to be understood that the toB service backend or the toC service backend can be integrated and deployed in the 5G remote control platform.

5G remote control platform: the 5G remote control platform is also the remote control center, which is mainly used for a policy service and a network quality monitoring service. For ease of understanding, the policy service and the network quality monitoring service are to be described below.

Policy service: the policy service interacts with a network deployment service platform (for example, an operator service platform), to specify a policy between the two parties, for example, specify an SLA parameter for 5G remote driving connection provided by the network deployment service platform. A network-related policy service configuration between the 5G remote control platform and the network deployment service platform can be implemented through an interface between an application function (AF) module and a network exposure function (NEF) module. That is to say, the AF may serve as part of a functional module of the 5G remote control platform to interact with the NEF in the network deployment service platform.

For the specific method for specifying the SLA parameter, reference may be made to the embodiment corresponding to FIG. 3. The description specified and configured for the network configuration rule in the foregoing steps is not described herein again.

Network quality monitoring service: through the network quality monitoring service, the 5G network connection quality can be dynamically detected. When the 5G network connection quality is degraded, corresponding measures are adopted on the Cloud and an unmanned vehicle side. For example, when the network connection quality is degraded on the unmanned vehicle side, the unmanned vehicle can be parked nearby according to a pre-configured policy.

Figure 7:
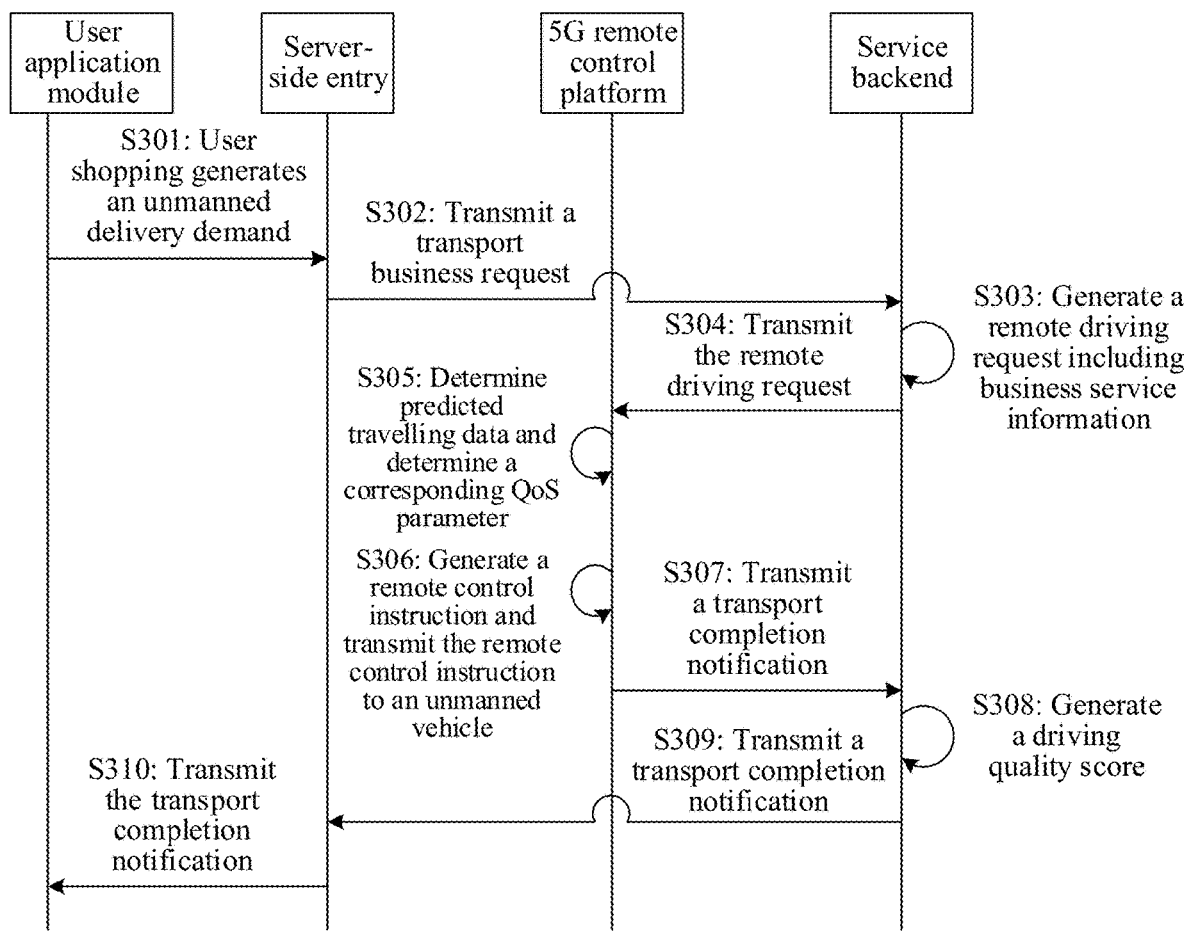
FIG. 7 is a process interaction diagram of an unmanned delivery service according to an embodiment of this disclosure.

In a possible implementation, FIG. 7 is a process interaction diagram of unmanned delivery according to an embodiment of this disclosure. As shown in FIG. 7, the process may include the following steps.

S301: A user application module transmits an unmanned delivery demand to a server-side entry.

In this disclosure, a user can purchase any item in a user application of a user terminal. When the user selects the unmanned delivery, the user application module may transmit the unmanned delivery demand initiated by the user to the server-side entry.

S302: The server-side entry transmits a transport business request to a service backend.

In this disclosure, the server-side entry may process the unmanned delivery demand, generate the transport business request and transmit the transport business request to the service backend, and may also transmit the item attributes (for example, an item volume, an item weight, and the like), receiving address information, ship-from address information, receiving user information, and the like to the service backend. The service backend may include a toC service backend and a toB service backend, and the server-side entry may classify the transport business requests. If the transport business request is a toC request, the transport business request is distributed to the toC service backend, and if the transport business request is a toB request, the transport business request is distributed to the toB service backend.

S303: The service backend generates a remote driving request.

In this disclosure, the service backend may generate the business service information including the item attributes (for example, the item volume, the item weight, and the like), the receiving address information, the ship-from address information, the receiving user information, and the expected transport time range, and then may generate the remote driving request including the business service information. For the specific method for generating the remote driving request by the service backend, reference may be made to the description of generating the remote driving request in S101 in the embodiment corresponding to FIG. 3, and the details are not described herein again.

S304: The service backend transmits the remote driving request to a 5G remote control platform.

In this disclosure, the service backend may transmit the remote driving request to the 5G remote control platform, and also transmit the business service information to the 5G remote control platform.

S305: The 5G remote control platform determines predicted travelling data according to the business service information, and determines an SLA parameter corresponding to the predicted travelling data.

In this disclosure, the 5G remote control platform may determine the predicted travelling data (which may include a predicted travelling route and a predicted travelling time) of the target item according to the business service information, and determine the SLA parameter (including a network coverage, network connection quality, a remote control mode, and the like) corresponding to the predicted travelling route and the predicted travelling time through a network configuration rule. For the specific method for determining the predicted travelling data of the target item according to the business service information by the 5G remote control platform (which may include the predicted travelling route and the predicted travelling time), and determining the SLA parameter corresponding to the predicted travelling route and the predicted travelling time through the network configuration rule, reference may be made to the relevant description in the embodiment corresponding to FIG. 3. For the description of determining the predicted travelling data and determining the QoS parameter corresponding to the predicted travelling data by the remote control platform, details are not described herein again.

S306: The 5G remote control platform generates a remote control instruction and transmits the remote control instruction to an unmanned vehicle.

In this disclosure, for the specific implementation of generating the remote control instruction by the 5G remote control platform, reference may be made to the description of generating the remote control instruction by the business server in S103 in the embodiment corresponding to FIG. 3, and the details are not described herein again.

S307: The 5G remote control platform transmits a transport completion notification to the service backend.

In this disclosure, after the unmanned vehicle completes the transport of the target item, a transport completion notification may be generated, and the transport completion notification is transmitted to the service backend.

S308: The service backend generates a driving quality score.

In this disclosure, the service backend may generate a driving quality score for this unmanned delivery service for quality evaluation upon completion of the transport.

S309: The service backend transmits the transport completion notification to the server-side entry.

S310: The server-side entry transmits the transport completion notification to the user application module.

In the embodiment of this disclosure, a 5G remote driving technology is introduced in delivery services for items, so as to control the unmanned vehicle to transport the items, thereby realizing unmanned delivery of the items, and saving a lot of labor costs. In addition, in this process, the network configuration rule is set, and different items correspond to different predicted travelling data. Different network communication resources may be configured for the unmanned vehicle according to the network configuration rule and the different predicted travelling data, so that the unmanned vehicle is within the network coverage on the travelling route between the driving origin and the driving destination and is connected to the network, and can be remotely controlled to travel by the network. In addition, the network communication resource may further be properly utilized. It can be learned that this disclosure may provide an unmanned delivery service for the item based on the 5G remote driving technology. The unmanned delivery is combined with the unmanned driving to realize personalized smart logistics based on the 5G system and realize full automation without manual participation, so as to save logistics costs.

Figure 8:
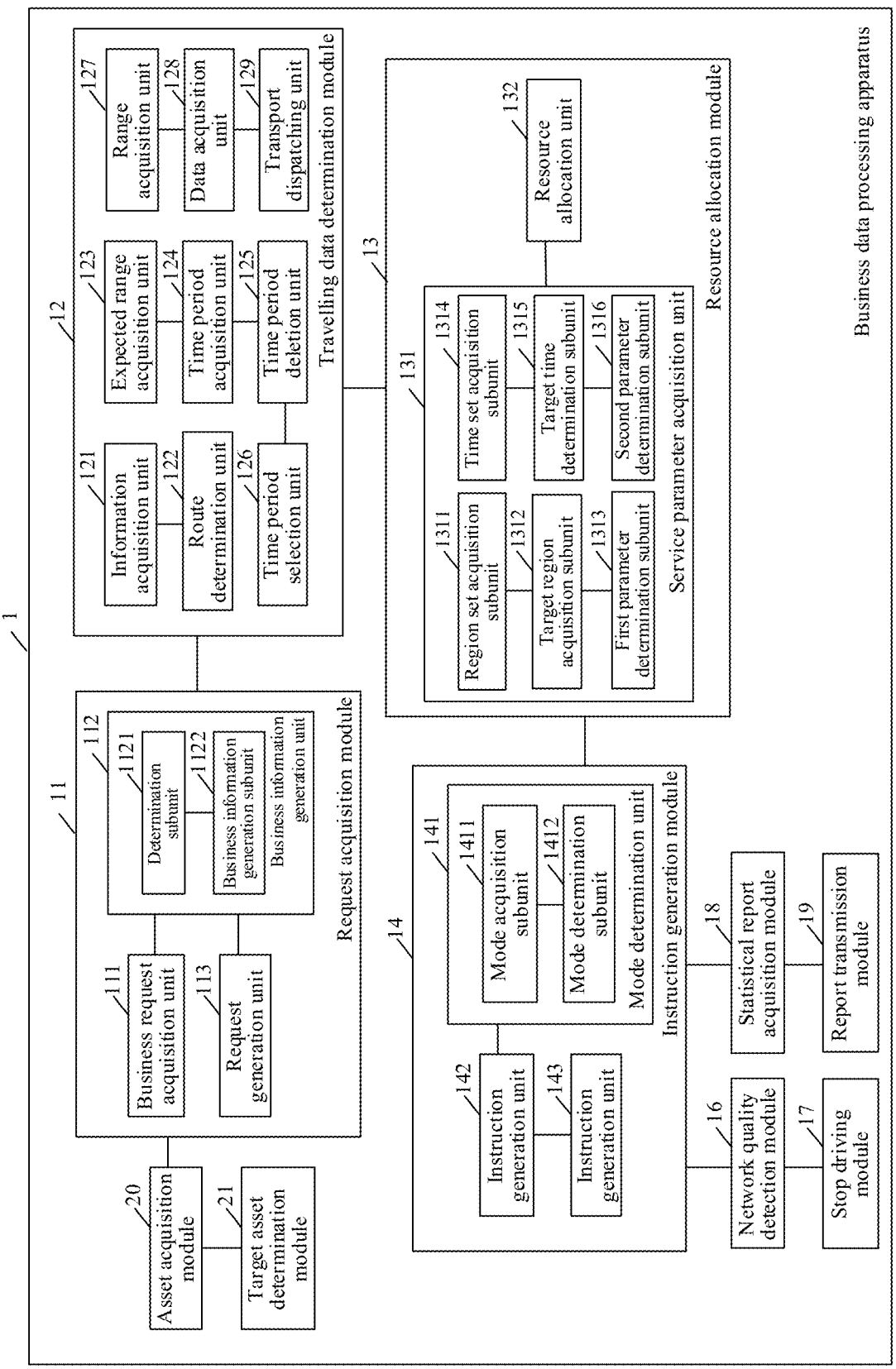
FIG. 8 is a schematic structural diagram of a business data processing apparatus according to an embodiment of this disclosure.

In a possible implementation, FIG. 8 is a schematic structural diagram of a business data processing apparatus according to an embodiment of this disclosure. The business data processing apparatus may be a computer program (including program code) run in a computer device. For example, the business data processing apparatus is application software. The business data processing apparatus may be configured to perform the method shown in FIG. 3. As shown in FIG. 8, the business data processing apparatus 1 may include a request acquisition module 11, a travelling data determination module 12, an instruction generation module 14, and an instruction transmission module 15.

The request acquisition module 11 is configured to acquire a remote driving control request for a target item. The remote driving control request includes business service information of the target item.

The travelling data determination module 12 is configured to determine, according to the business service information, predicted travelling data associated with the target item.

The instruction generation module 14 is configured to generate a remote driving control instruction according to the predicted travelling data.

The instruction transmission module 15 is configured to transmit the remote driving control instruction to an unmanned vehicle, so that the unmanned vehicle autonomously drives through the remote driving control instruction, the unmanned vehicle being a tool configured to transport the target item.

For specific implementations of the request acquisition module 11, the travelling data determination module 12, the instruction generation module 14, and the instruction transmission module 15, reference may be made to the description of S101-S103 in the embodiment corresponding to FIG. 3, and the details are not described herein again.

In a possible implementation, the apparatus further includes a resource allocation module 13 configured to acquire, according to a network configuration rule, a QoS parameter corresponding to the predicted travelling data, and allocate, to the unmanned vehicle, a network communication resource indicated by the QoS parameter.

The instruction transmission module 15 is specifically configured to transmit the remote driving control instruction to the unmanned vehicle to which the network communication resource is allocated.

The QoS parameter includes a network coverage and network connection quality.

Referring to FIG. 8, the resource allocation module 13 may include a service parameter acquisition unit 131 and a resource allocation unit 132.

The service parameter acquisition unit 131 is configured to acquire the QoS parameter from the network configuration rule according to the predicted travelling data. The QoS parameter includes a specified target network coverage and specified target network connection quality.

The resource allocation unit 132 is configured to allocate, to the unmanned vehicle according to a target base station indicated by the target network coverage and the target network connection quality, the network communication resource configured to realize the target network coverage and the target network connection quality. The target base station is located in a region through which travelling is carried out based on the predicted travelling data.

For specific implementations of the service parameter acquisition unit 131 and the resource allocation unit 132, reference may be made to the related description in the embodiment corresponding to FIG. 3, and the details are not described herein again.

The predicted travelling data includes a predicted travelling route.

Referring to FIG. 8, the service parameter acquisition unit 131 may include a region set acquisition subunit 1311, a target region acquisition subunit 1312, and a first parameter determination subunit 1313.

The region set acquisition subunit 1311 is configured to acquire a set of specified travelling regions in the network configuration rule. The set of specified travelling regions include at least two pieces of region information and the network coverage and the network connection quality specified for each piece of region information.

The target region acquisition subunit 1312 is configured to acquire at least one predicted travelling region included in the predicted travelling route, match the at least one predicted travelling region with the set of specified travelling regions, and determine target region information from the at least two pieces of region information. The target region information encompasses the predicted travelling region.

The first parameter determination subunit 1313 is configured to determine the network coverage specified by the target region information as the target network coverage of the predicted travelling region, and determine, as the target network connection quality of the predicted travelling region, the network connection quality specified for the target region information.

For the specific implementations of the region set acquisition subunit 1311, the target region acquisition subunit 1312, and the first parameter determination subunit 1313, reference may be made to the related description in the embodiment corresponding to FIG. 3, and the details are not described herein again.

The predicted travelling data includes the predicted travelling time.

Referring to FIG. 8, the service parameter acquisition unit 131 may include a time set acquisition subunit 1314, a target time determination subunit 1315, and a second parameter determination subunit 1316.

The time set acquisition subunit 1314 is configured to acquire a set of specified time periods in the network configuration rule. The set of specified time periods include at least two specified time periods and the network coverage and the network connection quality specified for each specified time period.

The target time determination subunit 1315 is configured to match the predicted travelling time with the set of specified time periods, and determine a target specified time period from the at least two specified time periods. The predicted travelling time is within the target specified time period.

The second parameter determination subunit 1316 is configured to determine, as the target network coverage of the predicted travelling time, the network coverage specified for the target specified time period, and determine, as the target network connection quality of the predicted travelling time, the network connection quality specified for the target specified time period.

For the specific implementations of the time set acquisition subunit 1314, the target time determination subunit 1315, and the second parameter determination subunit 1316, reference may be made to the related description in the embodiment corresponding to FIG. 3, and the details are not described herein again.

The remote driving control instruction includes a first driving instruction and a second driving instruction.

Referring to FIG. 8, the instruction generation module 14 may include a mode determination unit 141, an instruction generation unit 142, and an instruction generation unit 143.

The mode determination unit 141 is configured to acquire a road condition complexity corresponding to the predicted travelling data, and determine a remote control mode of the unmanned vehicle according to the network configuration rule and the road condition complexity.

The instruction generation unit 142 is configured to generate a first driving instruction according to the predicted travelling data in a case that the remote control mode is a control-by-wire mode. The first driving instruction is used for providing a driving direction and a driving speed for the unmanned vehicle.

The instruction generation unit 143 is further configured to generate a second driving instruction according to the predicted travelling data in a case that the remote control mode is a route guidance mode. The second driving instruction is used for providing travelling route information for the unmanned vehicle. The travelling route information is used for guiding the unmanned vehicle to obtain the driving direction and the driving speed through analysis.

For specific implementations of the mode determination unit 141, the instruction generation unit 142, and the instruction generation unit 143, reference may be made to the description of S103 in the embodiment corresponding to FIG. 3, and the details are not described herein again.

Referring to FIG. 8, the mode determination unit 141 may include a mode acquisition subunit 1411 and a mode determination subunit 1412.

The mode acquisition subunit 1411 is configured to acquire a specified remote control mode in the network configuration rule. The specified remote control mode includes the control-by-wire mode and the route guidance mode.

The mode determination subunit 1412 is configured to determine the remote control mode of the unmanned vehicle as the control-by-wire mode in a case that the road condition complexity is greater than a complexity threshold.

The mode determination subunit 1412 is further configured to acquire an autonomous driving function level of the unmanned vehicle in a case that the road condition complexity is less than or equal to the complexity threshold, and determine the remote control mode of the unmanned vehicle as the control-by-wire mode in a case that the autonomous driving function level does not satisfy an unmanned driving condition.

The mode determination subunit 1412 is further configured to determine the remote control mode of the unmanned vehicle as the route guidance mode in a case that the autonomous driving function level satisfies the unmanned driving condition.

For specific implementations of the mode acquisition subunit 1411 and the mode determination subunit 1412, reference may be made to the description of S103 in the embodiment corresponding to FIG. 3, and the details are not described herein again.

Referring to FIG. 8, the apparatus 1 may further include a network quality detection module 16 and a stop driving module 17.

The network quality detection module 16 is configured to detect the network connection quality of the unmanned vehicle in a case that the remote control mode of the unmanned vehicle is the control-by-wire mode.

The stop driving module 17 is configured to generate a stop driving instruction in a case that a quality level corresponding to the network connection quality of the unmanned vehicle is lower than a level threshold, and transmit the stop driving instruction to the unmanned vehicle, so that the unmanned vehicle is switched from a driving state to a stop driving state through the stop driving instruction.

For specific implementations of the network quality detection module 16 and the stop driving module 17, reference may be made to the description of S103 in the embodiment corresponding to FIG. 3, and the details are not described herein again.

Referring to FIG. 8, the request acquisition module 11 may include a business request acquisition unit 111, a business information generation unit 112, and a request generation unit 113.

The business request acquisition unit 111 is configured to acquire a transport business request for the target item, and acquire an item attribute and travelling address information of the target item in the transport business request.

The business information generation unit 112 is configured to acquire an initial transport time range corresponding to the travelling address information according to a business configuration rule, and generate the business service information for the target item according to the travelling address information, the initial transport time range, and the item attribute.

The request generation unit 113 is configured to generate the remote driving control request including the business service information.

For specific implementations of the business request acquisition unit 111, the business information generation unit 112, and the request generation unit 113, reference may be made to the description of S101 in the embodiment corresponding to FIG. 3, and the details are not described herein again.

The item attribute includes an item volume.

Referring to FIG. 8, the business information generation unit 112 may include a range determination subunit 1121 and a business information generation subunit 1122.

The range determination subunit 1121 is configured to determine a transport waiting time range corresponding to the target item according to a volume range to which the item volume belongs.

The range determination subunit 1121 is further configured to add up the initial transport time range and the transport waiting time range to obtain an expected transport time range of the target item.

The business information generation subunit 1122 is configured to generate the business service information for the target item according to the travelling address information, the item attribute, and the expected transport time range.

For specific implementations of the range determination subunit 1121 and the business information generation subunit 1122, reference may be made to the description of S101 in the embodiment corresponding to FIG. 3, and the details are not described herein again.

The predicted travelling data includes a predicted travelling route.

Referring to FIG. 8, the travelling data determination module 12 may include an information acquisition unit 121 and a route determination unit 122.

The information acquisition unit 121 is configured to acquire the travelling address information and the expected transport time range in the business service information.

The route determination unit 122 is configured to determine an initial predicted travelling route of the target item according to the travelling address information.

The route determination unit 122 is further configured to determine a predicted travelling time range corresponding to the initial predicted travelling route, and determine the initial predicted travelling route as the predicted travelling route corresponding to the target item in a case that the predicted travelling time range is within the expected transport time range.

For specific implementations of the information acquisition unit 121 and the route determination unit 122, reference may be made to the description of S102 in the embodiment corresponding to FIG. 3, and the details are not described herein again.

The predicted driving behavior data includes the predicted travelling time.

Referring to FIG. 8, the travelling data determination module 12 may include an expected range acquisition unit 123, a time period acquisition unit 124, a time period deletion unit 125, and a time period selection unit 126.

The expected range acquisition unit 123 is configured to acquire the expected transport time range in the business service information.

The time period acquisition unit 124 is configured to acquire a congested travelling time period within a specified travelling time period. The congested travelling time period is a time period with a congested travelling probability greater than a probability threshold.

The time period deletion unit 125 is configured to delete the congested travelling time period in the specified travelling time period to obtain a candidate travelling time period.

The time period selection unit 126 is configured to select the predicted travelling time period of the target item from the candidate travelling time period, and determine, as the predicted travelling time of the target item, a travelling time composed of the predicted travelling time period. The predicted travelling time is within the expected transport time range.

For specific implementations of the expected range acquisition unit 123, the time period acquisition unit 124, the time period deletion unit 125, and the time period selection unit 126, reference may be made to the description of S102 in the embodiment corresponding to FIG. 3, and the details are not described herein again.

Referring to FIG. 8, the travelling data determination module 12 may further include a range acquisition unit 127, a data acquisition unit 128, and a transport dispatching unit 129.

The range acquisition unit 127 is configured to acquire the travelling address information and the expected transport time range in the business service information.

The data acquisition unit 128 is configured to acquire, from the network configuration rule, a network coverage and network connection quality associated with the travelling address information and the expected transport time range.

The transport dispatching unit 129 is configured to perform transport dispatching on the target item according to the item attribute, the travelling address information, the expected transport time range, and the network coverage and the network connection quality associated with the travelling address information and the expected transport time range, to obtain the predicted travelling data.

For specific implementations of the range acquisition unit 127, the data acquisition unit 128, and the transport dispatching unit 129, reference may be made to the description of S102 in the embodiment corresponding to FIG. 3, and the details are not described herein again.

Referring to FIG. 8, the apparatus 1 may further include a statistical report acquisition module 18 and a report transmission module 19.

The statistical report acquisition module 18 is configured to acquire a data statistics report associated with the unmanned vehicle and the target item in a case that the unmanned vehicle completes transport of the target item. The data statistics report includes a network coverage and network connection quality on which statistics are collected by the unmanned vehicle during the transport.

The report transmission module 19 is configured to transmit the data statistics report to a user terminal, so that the user terminal generates a driving quality score through the network coverage and the network connection quality on which statistics are collected during the transport.

For specific implementations of the statistical report acquisition module 18 and the report transmission module 19, reference may be made to the description of S103 in the embodiment corresponding to FIG. 3, and the details are not described herein again.

The business service information includes a first consumable virtual asset for transporting the target item.

Referring to FIG. 8, the apparatus 1 may further include an asset acquisition module 20 and a target asset determination module 21.

The asset acquisition module 20 is configured to acquire a specified virtual asset specified for the QoS parameter in the network configuration rule, and use the specified virtual asset as a second consumable virtual asset for transporting the target item.

The target asset determination module 21 is configured to determine, according to the first consumable virtual asset and the second consumable virtual asset, a target consumable virtual asset for transporting the target item.

For specific implementations of the asset acquisition module 20 and the target asset determination module 21, reference may be made to the description of S13 in the embodiment corresponding to FIG. 3, and the details are not described herein again.

In the embodiments of this disclosure, a remote driving technology is introduced in delivery services for items, so as to control the unmanned vehicle to transport the items, thereby realizing unmanned delivery of the items, and saving a lot of labor costs. The item is a target item by way of example. A remote driving control request for a target item is acquired, and predicted travelling data associated with the target item is determined according to business service information in the remote driving control request, to generate a remote driving control instruction according to the predicted travelling data. The remote driving control instruction is transmitted to an unmanned vehicle, so that the unmanned vehicle can autonomously drive through the remote driving control instruction. It can be learned that this disclosure may provide an unmanned delivery service for the item based on the remote driving technology. The unmanned delivery is combined with the unmanned driving to realize personalized smart logistics based on the remote driving technology and realize full automation without manual participation, so as to save logistics costs.

Figure 9:
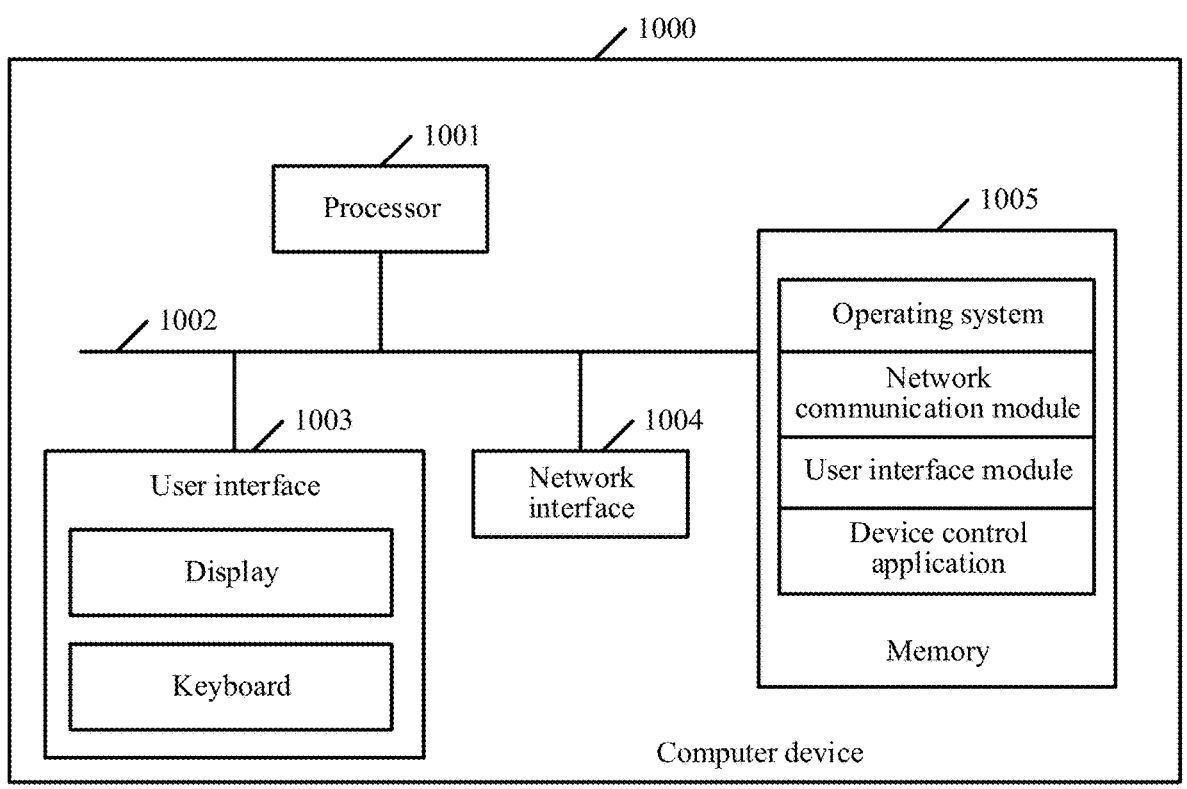
FIG. 9 is a schematic structural diagram of a computer device according to an embodiment of this disclosure.

Further, FIG. 9 is a schematic structural diagram of a computer device according to an embodiment of this disclosure. As shown in FIG. 9, foregoing device 1 in the embodiment corresponding to FIG. 8 may be applied to the computer device 1000. The computer device 1000 may include: a processor 1001 (including processing circuitry), a network interface 1004, and a memory 1005 (including a non-transitory computer-readable storage medium). In addition, the computer device 1000 further includes: a user interface 1003 and at least one communication bus 1002. The communication bus 1002 is configured to implement connection and communication between these components. The user interface 1003 may include a display and a keyboard. The user interface 1003 may further include a standard wired interface and a wireless interface. The network interface 1004 may comprise a standard wired interface and a standard wireless interface (such as a Wi-Fi interface). The memory 1005 may be a high-speed RAM, or may be a non-volatile memory, such as, at least one magnetic disk memory. The memory 1005 may further be at least one storage apparatus that is located far away from the processor 1001. As shown in FIG. 9, the memory 1005 used as a computer-readable storage medium may comprise an operating system, a network communication module, a user interface module, and a device-control application program.

In the computer device 1000 shown in FIG. 9, the network interface 1004 may provide a network communication function; the user interface 1003 is mainly configured to provide an input interface for a user; and The processor 1001 may be configured to call a device control application stored in the memory 1005 to:

acquire a remote driving control request for a target item, the remote driving control request including business service information of the target item;

determine, according to the business service information, predicted travelling data associated with the target item;

generate a remote driving control instruction according to the predicted travelling data; and transmit the remote driving control instruction to an unmanned vehicle, so that the unmanned vehicle autonomously drives through the remote driving control instruction, the unmanned vehicle being a tool configured to transport the target item.

It is to be understood that the computer device 1000 described in this embodiment of this disclosure can implement the descriptions of the business data processing method in the foregoing embodiment corresponding to FIG. 3, and can also implement the descriptions of the business data processing apparatus 1 in the foregoing embodiment corresponding to FIG. 8. Details are not described herein again. In addition, beneficial effects achieved by using the same method are not described herein again.

In addition, it should be pointed out that the embodiments of this disclosure further provide a computer-readable storage medium. The computer-readable storage medium stores a computer program executed by the data processing of a computer device 1000 mentioned above, and the computer program includes program instructions. When executing the program instructions, the processor can perform the descriptions of the business data processing method in the foregoing embodiment corresponding to FIG. 3. Therefore, details are not described herein again. In addition, beneficial effects achieved by using the same method are not described herein again. For technical details that are not disclosed in the embodiments of the computer-readable storage medium of this disclosure, refer to the method embodiments of this disclosure.

The foregoing computer-readable storage medium may be the business data processing apparatus provided in any one of the foregoing embodiments or an internal storage unit of the foregoing computer device, for example, a hard disk or an internal memory of the computer device. The computer-readable storage medium may alternatively be an external storage device of the computer device, for example, a removable hard disk, a smart memory card (SMC), a secure digital (SD) card, or a flash card equipped on the computer device. Further, the computer-readable storage medium may further include both an internal storage unit and an external storage device of the computer device. The computer-readable storage medium is configured to store the computer program and another program and data that are required by the computer device. The computer-readable storage medium may further be configured to temporarily store data that has been output or data to be output.

An aspect of this disclosure provides a computer program product or a computer program, where the computer program product or the computer program includes computer instructions, the computer instructions being stored in a computer readable storage medium. A processor of a computer device reads the computer instructions from the computer-readable storage medium, and executes the computer instructions, causing the computer device to perform the method according to an aspect of the embodiments of this disclosure.

In the specification, claims, and accompanying drawings of the embodiments of this disclosure, the terms "first" and "second" and the like are intended to distinguish between different objects but do not indicate a particular order. In addition, term "comprise" and any variations thereof are intended to cover non-exclusive inclusion. For example, a process, method, system, product, or device that includes a series of steps or units is not limited to the listed steps or units; and instead, further includes a step or unit that is not listed, or further includes other step or unit that is intrinsic to the process, method, product, or device.

A person of ordinary skill in the art may be aware that, in combination with examples of units and algorithm steps described in the embodiments disclosed in this specification, this disclosure may be implemented by using electronic hardware, computer software, or a combination thereof. To clearly describe interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

The method and the related apparatus provided in the embodiments of this disclosure are described with reference to the method flowcharts and/or schematic structural diagrams provided in the embodiments of this disclosure. Specifically, each process and/or block in the method flowchart and/or the schematic structural diagram and a combination of the process and/or the block in the flowchart and/or the block diagram may be implemented by a computer program instruction. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may alternatively be stored in a computer-readable memory that can instruct a computer or another programmable data processing device to work in a specific manner, so that the instructions stored in the computer-readable memory generate an artifact that comprises an instruction apparatus. The instruction apparatus implements a specific function in one or more procedures in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An unmanned vehicle control method, comprising:
   acquiring a delivery request for an item, the delivery request comprising delivery information of the item, the delivery information including a first consumable virtual asset for transporting the item;
   determining, according to the delivery information, predicted travelling data associated with delivering the item and determining network coverage of a predicted travelling route indicated by the predicted travelling data, and allocating network resources to an unmanned vehicle based on a quality of service (QoS) parameter and the network coverage of the predicted travelling route indicated by the predicted travelling data, the predicted travelling route including a plurality of predicted travelling regions;
   generating a remote control instruction according to the predicted travelling data;
   transmitting the remote control instruction to the unmanned vehicle, to which the network resources are allocated, using the allocated network resources, and causing the unmanned vehicle to move based on the remote control instruction, the unmanned vehicle being configured to transport the item;
   setting, according to a virtual asset specified for the QoS parameter in a network configuration rule, the specified virtual asset as a second consumable virtual asset for transporting the item; and
   determining, according to the first consumable virtual asset and the second consumable virtual asset, a target consumable virtual asset for transporting the item, wherein
   the determining the network coverage includes acquiring the QoS parameter corresponding to the network coverage of the predicted travelling route indicated by the predicted travelling data according to the network configuration rule; and
   the acquiring the QoS parameter includes:
      acquiring a set of travelling regions defined in the network configuration rule, and
      for each of the plurality of predicted travelling regions, matching the respective predicted travelling region with a respective region in the set of travelling regions; and
      determining that the network coverage of the respective region in the set of travelling regions is used as the network coverage of the predicted travelling region, the network coverage of the predicted travelling route indicated by the predicted travelling data including the network coverage of the plurality of predicted travelling regions.

2. The method according to claim 1, wherein
the QoS parameter indicates a network connection quality associated with the predicted travelling data; and
the allocating includes allocating, to the unmanned vehicle according to a base station indicated by the network coverage and the network connection quality, the network resources being associated with the network coverage and the network connection quality, the base station providing communication service to a region through which the unmanned vehicle is predicted to travel based on the predicted travelling data.

3. The method according to claim 2, wherein the acquiring the QoS parameter further comprises:
determining that a network connection quality of the respective region in the set of travelling regions is used as a network connection quality of the predicted travelling region, the network connection quality of the predicted travelling data including the network connection qualities of the plurality of predicted travelling regions.

4. The method according to claim 2, wherein
the predicted travelling data comprises a predicted travelling time; and the acquiring the QoS parameter from the network configuration rule according to the predicted travelling data further comprises:
  acquiring a set of time periods in the network configuration rule, the set of time periods comprising at least two time periods and comprising a network coverage and a network connection quality specified for each time period;
  matching the predicted travelling time with a time period in the set of time periods, and selecting the time period, the predicted travelling time being within the selected time period; and
  determining, as the network coverage associated with the predicted travelling data, the network coverage specified for the selected time period, and determining, as the network connection quality associated with the predicted travelling data, the network connection quality specified for the selected time period.

5. The method according to claim 1, wherein
the remote control instruction comprises a first driving instruction or a second driving instruction; and
the generating comprises:
  acquiring a road condition complexity corresponding to the predicted travelling data, and determining a remote control mode of the unmanned vehicle according to the network configuration rule and the road condition complexity; and
  performing one of:
    based on the remote control mode being a control-by-wire mode, generating the first driving instruction according to the predicted travelling data, the first driving instruction providing a driving direction and a driving speed for the unmanned vehicle; and
    based on the remote control mode being a route guidance mode, generating the second driving instruction according to the predicted travelling data, the second driving instruction providing travelling route information configured to guide the unmanned vehicle to determine the driving direction and the driving speed.

6. The method according to claim 5, wherein the determining the remote control mode comprises:
  acquiring remote control modes defined in the network configuration rule, the defined remote control modes comprising the control-by-wire mode and the route guidance mode; and
  performing one of:
    based on the road condition complexity being greater than a complexity threshold, determining the remote control mode of the unmanned vehicle as the control-by-wire mode; and
    based on the road condition complexity being less than or equal to the complexity threshold, performing one of:
      acquiring an autonomous driving function level of the unmanned vehicle, and determining the remote control mode of the unmanned vehicle as the control-by-wire mode based on the autonomous driving function level not satisfying an unmanned driving condition; and
      determining the remote control mode of the unmanned vehicle as the route guidance mode based on the autonomous driving function level satisfying the unmanned driving condition.

7. The method according to claim 5, further comprising:
  detecting network connection quality of the unmanned vehicle based on the remote control mode of the unmanned vehicle being the control-by-wire mode; and
  generating a stop driving instruction based on the network connection quality of the unmanned vehicle being lower than a level threshold, transmitting the stop driving instruction to the unmanned vehicle, and causing the unmanned vehicle to switch from a driving state to a stopped state according to the stop driving instruction.

8. The method according to claim 1, wherein the acquiring the delivery request comprises:
  acquiring a transport request for the item, and acquiring an item attribute and address information of the item in the transport request;
  acquiring an initial transport time range corresponding to the address information according to a configuration rule, and generating the delivery information for the item according to the address information, the initial transport time range, and the item attribute; and
  generating the delivery request comprising the delivery information.

9. The method according to claim 8, wherein
the item attribute comprises an item volume; and
the generating the delivery information comprises:
  determining a transport waiting time range corresponding to the item according to a volume range to which the item volume belongs;
  adding up the initial transport time range and the transport waiting time range to obtain an expected transport time range of the item; and
  generating the delivery information for the item according to the address information, the item attribute, and the expected transport time range.

10. The method according to claim 9, wherein
the determining, according to the delivery information, the predicted travelling data comprises:
  acquiring the address information and the expected transport time range in the delivery information;
  determining an initial predicted travelling route of the item according to the address information; and
  determining a predicted travelling time range corresponding to the initial predicted travelling route, and setting the initial predicted travelling route as the predicted travelling route corresponding to the item when the predicted travelling time range is within the expected transport time range.

11. The method according to claim 9, wherein
the predicted travelling data comprises a predicted travelling time; and
the determining, according to the delivery information, the predicted travelling data comprises:
  acquiring the expected transport time range in the delivery information;
  acquiring a congested travelling time period, the congested travelling time period being a time period with a congested travelling probability greater than a probability threshold;
  removing the congested travelling time period from the expected transport time range to obtain a candidate travelling time period; and
  selecting a predicted travelling time period of the item from the candidate travelling time period, and setting, as the predicted travelling time of the item, the predicted travelling time period, the predicted travelling time being within the expected transport time range.

12. The method according to claim 9, wherein the determining, according to the delivery information, the predicted travelling data comprises:
acquiring the address information and the expected transport time range in the delivery information;
acquiring, from the network configuration rule, a network coverage and network connection quality associated with the address information and the expected transport time range; and
performing transport aggregation of the item and another item according to the item attribute, the address information, the expected transport time range, and the network coverage and the network connection quality associated with the address information and the expected transport time range, to obtain the predicted travelling data.

13. The method according to claim 1, further comprising:
acquiring a data statistics report associated with the unmanned vehicle and the item after the unmanned vehicle completes transport of the item, the data statistics report comprising network coverage statistics and network connection quality statistics collected by the unmanned vehicle during the transport; and
transmitting the data statistics report to a user terminal, so that the user terminal generates a driving quality score based on the network coverage statistics and the network connection quality statistics collected during the transport.

14. An unmanned vehicle control apparatus, comprising:
processing circuitry configured to
acquire a delivery request for an item, the delivery request comprising delivery information of the item, the delivery information including a first consumable virtual asset for transporting the item;
determine, according to the delivery information, predicted travelling data associated with delivering the item and determine a network coverage of a predicted travelling route indicated by the predicted travelling data, and allocate network resources to an unmanned vehicle based on a quality of service (QoS) parameter and the network coverage of the predicted travelling route indicated by the predicted travelling data, the predicted travelling route including a plurality of predicted travelling regions;
generate a remote control instruction according to the predicted travelling data;
transmit the remote control instruction to the unmanned vehicle, to which the network resources are allocated, using the allocated network resources, and causing the unmanned vehicle to move based on the remote control instruction, the unmanned vehicle being configured to transport the item
set, according to a virtual asset specified for the QoS parameter in a network configuration rule, the specified virtual asset as a second consumable virtual asset for transporting the item; and
determine, according to the first consumable virtual asset and the second consumable virtual asset, a target consumable virtual asset for transporting the item, wherein
the network coverage is determined by acquiring the QoS parameter corresponding to the network coverage of the predicted travelling route indicated by the predicted travelling data according to the network configuration rule; and
the processing circuitry is configured to:
acquire the QoS parameter by:
acquiring a set of travelling regions defined in the network configuration rule, and
for each of the plurality of predicted travelling regions,
matching the respective predicted travelling region with a respective region in the set of travelling regions; and
determining that the network coverage of the respective region in the set of travelling regions is used as the network coverage of the predicted travelling region, the network coverage of the predicted travelling route indicated by the predicted travelling data including the network coverage of the plurality of predicted travelling regions.

15. The apparatus according to claim 14, wherein
the QoS parameter indicates a network connection quality associated with the predicted travelling data; and
the processing circuitry is further configured to allocate, to the unmanned vehicle according to a base station indicated by the network coverage and the network connection quality, the network resources being associated with the network coverage and the network connection quality, the base station providing communication service to a region through which the unmanned vehicle is predicted to travel based on the predicted travelling data.

16. The apparatus according to claim 15, wherein
the processing circuitry is further configured to determine that a network connection quality of the respective region in the set of travelling regions is used as a network connection quality of the predicted travelling region, the network connection quality of the predicted travelling data including the network connection qualities of the plurality of predicted travelling regions.

17. A non-transitory computer-readable storage medium storing computer-readable instructions thereon, which, when executed by a computer device, cause the computer device to perform an unmanned vehicle control method, comprising:
acquiring a delivery request for an item, the delivery request comprising delivery information of the item, the delivery information including a first consumable virtual asset for transporting the item;
determining, according to the delivery information, predicted travelling data associated with delivering the item and determining network coverage of a predicted travelling route indicated by the predicted travelling data, and allocating network resources to an unmanned vehicle based on a quality of service (QoS) parameter and the network coverage of the predicted travelling route indicated by the predicted travelling data, the predicted travelling route including a plurality of predicted travelling regions;
generating a remote control instruction according to the predicted travelling data;
transmitting the remote control instruction to the unmanned vehicle, to which the network resources are allocated, using the allocated network resources, and causing the unmanned vehicle to move based on the remote control instruction, the unmanned vehicle being configured to transport the item;

setting, the specified virtual asset as a second consumable virtual asset for transporting the item according to a virtual asset specified for the QoS parameter in a network configuration rule; and determining, according to the first consumable virtual asset and the second consumable virtual asset, a target consumable virtual asset for transporting the item, wherein the determining the network coverage includes acquiring the QoS parameter corresponding to the network coverage of the predicted travelling route indicated by the predicted travelling data according to the network configuration rule; and the acquiring the QoS parameter includes:
- acquiring a set of travelling regions defined in the network configuration rule, and
- for each of the plurality of predicted travelling regions,
  - matching the respective predicted travelling region with a respective region in the set of travelling regions; and
  - determining that the network coverage of the respective region in the set of travelling regions is used as the network coverage of the predicted travelling region, the network coverage of the predicted travelling route indicated by the predicted travelling data including the network coverage of the plurality of predicted travelling regions.

\* \* \* \* \*